United States Patent
Dart et al.

(10) Patent No.: US 9,521,289 B2
(45) Date of Patent: Dec. 13, 2016

(54) LINE BASED IMAGE PROCESSING AND FLEXIBLE MEMORY SYSTEM

(71) Applicant: FLIR Systems, Inc., Wilsonville, OR (US)

(72) Inventors: David W. Dart, Santa Barbara, CA (US); Weilming Sieh, Las Vegas, NV (US); Nicholas Högasten, Santa Barbara, CA (US); Theodore R. Hoelter, Goleta, CA (US); Katrin Strandemar, Rimbo (SE); Pierre Boulanger, Goleta, CA (US); Barbara Sharp, Santa Barbara, CA (US); Eric A. Kurth, Santa Barbara, CA (US)

(73) Assignee: FLIR Systems, Inc., Wilsonville, OR (US)

( * ) Notice: Subject to any disclaimer, the term of this patent is extended or adjusted under 35 U.S.C. 154(b) by 354 days.

(21) Appl. No.: 14/101,209

(22) Filed: Dec. 9, 2013

(65) Prior Publication Data
US 2014/0092258 A1   Apr. 3, 2014

Related U.S. Application Data

(63) Continuation of application No. PCT/US2012/041756, filed on Jun. 8, 2012.
(Continued)

(51) Int. Cl.
G06T 1/20 (2006.01)
H04N 5/33 (2006.01)
H04N 1/21 (2006.01)

(52) U.S. Cl.
CPC .............. *H04N 1/2137* (2013.01); *G06T 1/20* (2013.01); *H04N 5/33* (2013.01)

(58) Field of Classification Search
CPC ............ H04N 1/2137; G06T 1/20; G01J 5/20
See application file for complete search history.

(56) References Cited

U.S. PATENT DOCUMENTS 2,764,055 A   9/1956  Clemens et al.
4,742,552 A * 5/1988  Andrews ................... G06T 1/20
                                                              382/303
(Continued)

FOREIGN PATENT DOCUMENTS

CN    2874947    2/2007
CN    2899321    5/2007
(Continued)

*Primary Examiner* — Andy Rao
*Assistant Examiner* — Tyler Edwards
(74) *Attorney, Agent, or Firm* — Haynes and Boone, LLP

(57) ABSTRACT

Techniques are provided to implement line based processing of thermal images and a flexible memory system. In one example, individual lines of a thermal image frame may be provided to an image processing pipeline. Image processing operations may be performed on the individual lines in stages of the image processing pipeline. A memory system may be used to buffer the individual lines in the pipeline stages. In another example, a memory system may be used to send and receive data between various components without relying on a single shared bus. Data transfers may be performed between different components and different memories of the memory system using a switch fabric to route data over different buses. In another example, a memory system may support data transfers using different clocks of various components, without requiring the components and the memory system to all be synchronized to the same clock source.

16 Claims, 19 Drawing Sheets

Related U.S. Application Data

(60) Provisional application No. 61/646,750, filed on May 14, 2012, provisional application No. 61/646,732, filed on May 14, 2012, provisional application No. 61/545,056, filed on Oct. 7, 2011, provisional application No. 61/495,873, filed on Jun. 10, 2011, provisional application No. 61/495,879, filed on Jun. 10, 2011, provisional application No. 61/495,888, filed on Jun. 10, 2011.

(56) References Cited

U.S. PATENT DOCUMENTS

| | | |
|---|---|---|
| 6,348,951 B1 | 2/2002 | Kim |
| 6,396,543 B1 | 5/2002 | Shin et al. |
| 6,424,843 B1 | 7/2002 | Reitmaa et al. |
| 6,633,231 B1 | 10/2003 | Okamoto et al. |
| 6,681,120 B1 | 1/2004 | Kim |
| 6,883,054 B2 | 4/2005 | Yamaguchi et al. |
| 6,911,652 B2 | 6/2005 | Walkenstein |
| 7,050,107 B1 | 5/2006 | Frank et al. |
| D524,785 S | 7/2006 | Huang |
| 7,084,857 B2 | 8/2006 | Lieberman et al. |
| 7,208,733 B2 | 4/2007 | Mian et al. |
| 7,263,379 B1 | 8/2007 | Parkulo et al. |
| 7,284,921 B2 | 10/2007 | Lapstun et al. |
| 7,296,747 B2 | 11/2007 | Rohs |
| 7,305,368 B2 | 12/2007 | Lieberman et al. |
| 7,321,783 B2 | 1/2008 | Kim |
| 7,333,832 B2 | 2/2008 | Tsai et al. |
| 7,377,835 B2 | 5/2008 | Parkulo et al. |
| 7,453,064 B2 | 11/2008 | Lee |
| 7,477,309 B2 | 1/2009 | Cuccias |
| 7,567,818 B2 | 7/2009 | Pylkko |
| 7,572,077 B2 | 8/2009 | Lapstun et al. |
| 7,575,077 B2 | 8/2009 | Priepke et al. |
| 7,595,904 B2 | 9/2009 | Lapstun et al. |
| 7,627,364 B2 | 12/2009 | Sato |
| 7,697,962 B2 | 4/2010 | Cradick et al. |
| 7,723,686 B2 | 5/2010 | Hannebauer |
| 7,725,141 B2 | 5/2010 | Su |
| 7,728,281 B2 | 6/2010 | Chen |
| 7,735,974 B2 | 6/2010 | Silverbrook et al. |
| 7,747,454 B2 | 6/2010 | Bartfeld et al. |
| 7,760,919 B2 | 7/2010 | Namgoong |
| 7,761,114 B2 | 7/2010 | Silverbrook et al. |
| 7,773,870 B2 | 8/2010 | Naruse |
| 7,801,733 B2 | 9/2010 | Lee et al. |
| 7,810,733 B2 | 10/2010 | Silverbrook et al. |
| 7,900,842 B2 | 3/2011 | Silverbrook et al. |
| 7,903,152 B2 | 3/2011 | Kim |
| 7,947,222 B2 | 5/2011 | Bae et al. |
| 7,960,700 B2 | 6/2011 | Craig et al. |
| 8,275,413 B1 | 9/2012 | Fraden et al. |
| 8,305,577 B2 | 11/2012 | Kivioja et al. |
| 8,345,226 B2 | 1/2013 | Zhang |
| 8,537,343 B2 | 9/2013 | Zhang |
| 2002/0006337 A1 | 1/2002 | Kimura et al. |
| 2002/0122036 A1 | 9/2002 | Sasaki |
| 2002/0135571 A1 | 9/2002 | Klocek et al. |
| 2002/0149600 A1 | 10/2002 | Van Splunter et al. |
| 2003/0007193 A1 | 1/2003 | Sato et al. |
| 2003/0112871 A1 | 6/2003 | Demos |
| 2003/0122957 A1 | 7/2003 | Emme |
| 2003/0223623 A1 | 12/2003 | Gutta et al. |
| 2004/0047518 A1 | 3/2004 | Tiana |
| 2004/0101298 A1 | 5/2004 | Mandelbaum et al. |
| 2004/0127156 A1 | 7/2004 | Park |
| 2004/0128070 A1 | 7/2004 | Schmidt et al. |
| 2004/0157612 A1 | 8/2004 | Kim |
| 2004/0165788 A1 | 8/2004 | Perez et al. |
| 2004/0169860 A1 | 9/2004 | Jung et al. |
| 2004/0177190 A1* | 9/2004 | MacInnis .......... G06T 9/00 710/240 |
| 2004/0207036 A1 | 10/2004 | Ikeda |
| 2004/0256561 A1 | 12/2004 | Beuhler et al. |
| 2005/0030314 A1 | 2/2005 | Dawson |
| 2005/0067852 A1 | 3/2005 | Jeong |
| 2005/0068333 A1 | 3/2005 | Nakahashi et al. |
| 2005/0089241 A1 | 4/2005 | Kawanishi et al. |
| 2005/0093890 A1 | 5/2005 | Baudisch |
| 2005/0110803 A1 | 5/2005 | Sugimura |
| 2005/0138569 A1 | 6/2005 | Baxter et al. |
| 2005/0169655 A1 | 8/2005 | Koyama et al. |
| 2005/0184993 A1 | 8/2005 | Ludwin et al. |
| 2005/0213813 A1 | 9/2005 | Lin et al. |
| 2005/0213853 A1 | 9/2005 | Maier et al. |
| 2005/0219249 A1 | 10/2005 | Xie et al. |
| 2005/0248912 A1 | 11/2005 | Kang et al. |
| 2005/0265688 A1 | 12/2005 | Kobayashi |
| 2005/0270784 A1 | 12/2005 | Hahn et al. |
| 2005/0277447 A1 | 12/2005 | Buil et al. |
| 2006/0039686 A1 | 2/2006 | Soh et al. |
| 2006/0060984 A1 | 3/2006 | Wakabayashi et al. |
| 2006/0077246 A1 | 4/2006 | Kawakami et al. |
| 2006/0097172 A1 | 5/2006 | Park |
| 2006/0120712 A1 | 6/2006 | Kim |
| 2006/0132642 A1 | 6/2006 | Hosaka et al. |
| 2006/0140501 A1 | 6/2006 | Tadas |
| 2006/0147191 A1 | 7/2006 | Kim |
| 2006/0154559 A1 | 7/2006 | Yoshida |
| 2006/0210249 A1 | 9/2006 | Seto |
| 2006/0234744 A1 | 10/2006 | Sung et al. |
| 2006/0240867 A1 | 10/2006 | Wang et al. |
| 2006/0279758 A1 | 12/2006 | Myoki |
| 2006/0285907 A1 | 12/2006 | Kang et al. |
| 2007/0019077 A1 | 1/2007 | Park |
| 2007/0019085 A1* | 1/2007 | Suzuki .......... H04N 5/361 348/241 |
| 2007/0019099 A1 | 1/2007 | Lieberman et al. |
| 2007/0019103 A1 | 1/2007 | Lieberman et al. |
| 2007/0024731 A1* | 2/2007 | Muramatsu .......... H03M 1/1019 348/308 |
| 2007/0033309 A1 | 2/2007 | Kuwabara et al. |
| 2007/0034800 A1 | 2/2007 | Huang |
| 2007/0052616 A1 | 3/2007 | Yoon |
| 2007/0057764 A1 | 3/2007 | Sato et al. |
| 2007/0103479 A1 | 5/2007 | Kim et al. |
| 2007/0120879 A1 | 5/2007 | Kanade et al. |
| 2007/0132858 A1 | 6/2007 | Chiba et al. |
| 2007/0139739 A1 | 6/2007 | Kim et al. |
| 2007/0159524 A1 | 7/2007 | Kim et al. |
| 2007/0189583 A1 | 8/2007 | Shimada et al. |
| 2007/0211965 A1 | 9/2007 | Helbing et al. |
| 2007/0222798 A1 | 9/2007 | Kuno |
| 2007/0248284 A1 | 10/2007 | Bernsen et al. |
| 2007/0274541 A1 | 11/2007 | Uetake et al. |
| 2007/0285439 A1 | 12/2007 | King et al. |
| 2007/0286517 A1 | 12/2007 | Paik et al. |
| 2007/0299226 A1 | 12/2007 | Park et al. |
| 2008/0038579 A1 | 2/2008 | Schuisky et al. |
| 2008/0055466 A1* | 3/2008 | Garg .......... H04N 5/21 348/452 |
| 2008/0056612 A1 | 3/2008 | Park et al. |
| 2008/0079834 A1 | 4/2008 | Chung et al. |
| 2008/0112012 A1 | 5/2008 | Yokoyama et al. |
| 2008/0151056 A1 | 6/2008 | Ahamefula |
| 2008/0165190 A1 | 7/2008 | Min et al. |
| 2008/0165342 A1 | 7/2008 | Yoshida et al. |
| 2008/0170082 A1 | 7/2008 | Kim |
| 2008/0218474 A1 | 9/2008 | Ahn et al. |
| 2008/0248833 A1 | 10/2008 | Silverbrook et al. |
| 2008/0266079 A1 | 10/2008 | Lontka |
| 2008/0278772 A1 | 11/2008 | Silverbrook et al. |
| 2008/0284880 A1 | 11/2008 | Numata |
| 2008/0292144 A1 | 11/2008 | Kim |
| 2008/0297614 A1 | 12/2008 | Lieberman et al. |
| 2009/0023421 A1 | 1/2009 | Parkulo et al. |
| 2009/0027525 A1 | 1/2009 | Lin et al. |
| 2009/0040042 A1 | 2/2009 | Lontka |
| 2009/0040195 A1 | 2/2009 | Njolstad et al. |
| 2009/0052883 A1 | 2/2009 | Lee et al. |
| 2009/0129700 A1 | 5/2009 | Rother et al. |
| 2009/0131104 A1 | 5/2009 | Yoon |

(56) References Cited

U.S. PATENT DOCUMENTS

| | | |
|---|---|---|
| 2009/0148019 A1 | 6/2009 | Hamada et al. |
| 2009/0213110 A1 | 8/2009 | Kato et al. |
| 2009/0215479 A1 | 8/2009 | Karmarkar |
| 2009/0227287 A1 | 9/2009 | Kotidis |
| 2009/0238238 A1 | 9/2009 | Hollander et al. |
| 2009/0278048 A1 | 11/2009 | Choe et al. |
| 2009/0297062 A1 | 12/2009 | Molne et al. |
| 2010/0066866 A1 | 3/2010 | Lim |
| 2010/0090983 A1 | 4/2010 | Challener et al. |
| 2010/0103141 A1 | 4/2010 | Challener et al. |
| 2010/0113068 A1 | 5/2010 | Rothschild |
| 2010/0131268 A1 | 5/2010 | Moeller |
| 2010/0144387 A1 | 6/2010 | Chou |
| 2010/0163730 A1 | 7/2010 | Schmidt et al. |
| 2010/0234067 A1 | 9/2010 | Silverbrook et al. |
| 2010/0245582 A1 | 9/2010 | Harel |
| 2010/0245585 A1 | 9/2010 | Fisher et al. |
| 2010/0245826 A1 | 9/2010 | Lee |
| 2010/0314543 A1 | 12/2010 | Lee et al. |
| 2011/0043486 A1 | 2/2011 | Hagiwara et al. |
| 2011/0063446 A1 | 3/2011 | McMordie et al. |
| 2011/0102599 A1 | 5/2011 | Kwon et al. |
| 2011/0117532 A1 | 5/2011 | Relyea et al. |
| 2011/0121978 A1 | 5/2011 | Schwörer et al. |
| 2011/0122075 A1 | 5/2011 | Seo et al. |
| 2011/0128384 A1 | 6/2011 | Tiscareno et al. |
| 2012/0007987 A1 | 1/2012 | Gaber |
| 2012/0083314 A1 | 4/2012 | Ng et al. |
| 2012/0184252 A1 | 7/2012 | Hirsch |
| 2012/0273688 A1 | 11/2012 | Tsai et al. |
| 2012/0274814 A1 | 11/2012 | Wajs |
| 2012/0276954 A1 | 11/2012 | Kowalsky |
| 2012/0292518 A1 | 11/2012 | Goldstein |
| 2013/0204570 A1 | 8/2013 | Mendelson et al. |

FOREIGN PATENT DOCUMENTS

| | | |
|---|---|---|
| CN | 201203922 | 3/2009 |
| CN | 101635754 | 1/2010 |
| CN | 201481406 | 5/2010 |
| CN | 201550169 | 8/2010 |
| CN | 101859209 | 10/2010 |
| CN | 101883220 | 11/2010 |
| CN | 201628839 | 11/2010 |
| CN | 101945154 | 1/2011 |
| CN | 102055836 | 5/2011 |
| CN | 201897853 | 7/2011 |
| CN | 102178510 | 9/2011 |
| CN | 102880289 | 1/2013 |
| CN | 202998279 | 6/2013 |
| EP | 2477391 | 7/2012 |
| JP | 1997275518 | 4/1999 |
| JP | 2004048571 | 2/2004 |
| JP | 2006098098 | 4/2006 |
| JP | 2006105655 | 4/2006 |
| JP | 2007006475 | 1/2007 |
| JP | 2007325842 | 12/2007 |
| JP | 2010181324 | 8/2010 |
| KR | 20000026757 | 5/2000 |
| KR | 100227582 | 11/2000 |
| KR | 100272582 | 11/2000 |
| KR | 20000073381 | 12/2000 |
| KR | 100285817 | 1/2001 |
| KR | 20010001341 | 1/2001 |
| KR | 20010002462 | 1/2001 |
| KR | 20010010010 | 2/2001 |
| KR | 20010014992 | 2/2001 |
| KR | 20010044756 | 6/2001 |
| KR | 20010050263 | 6/2001 |
| KR | 20010060752 | 7/2001 |
| KR | 20010068202 | 7/2001 |
| KR | 20010070355 | 7/2001 |
| KR | 20010074565 | 8/2001 |
| KR | 20020006967 | 1/2002 |
| KR | 20020044339 | 6/2002 |
| KR | 20020049605 | 6/2002 |
| KR | 20060071220 | 6/2002 |
| KR | 20020061406 | 7/2002 |
| KR | 20020061920 | 7/2002 |
| KR | 20020069690 | 9/2002 |
| KR | 20020078469 | 10/2002 |
| KR | 20020083368 | 11/2002 |
| KR | 20020083961 | 11/2002 |
| KR | 20020085124 | 11/2002 |
| KR | 20020085490 | 11/2002 |
| KR | 20020095752 | 12/2002 |
| KR | 20030000332 | 1/2003 |
| KR | 20030007030 | 1/2003 |
| KR | 20030012444 | 2/2003 |
| KR | 20030016607 | 3/2003 |
| KR | 20030024545 | 3/2003 |
| KR | 20030037101 | 5/2003 |
| KR | 20030051140 | 6/2003 |
| KR | 20030055693 | 7/2003 |
| KR | 20030056667 | 7/2003 |
| KR | 20030067116 | 8/2003 |
| KR | 20030085742 | 11/2003 |
| KR | 20030088968 | 11/2003 |
| KR | 20040001684 | 1/2004 |
| KR | 20040001686 | 1/2004 |
| KR | 20040023826 | 3/2004 |
| KR | 20040027692 | 4/2004 |
| KR | 20040033223 | 4/2004 |
| KR | 20040033532 | 4/2004 |
| KR | 20040033986 | 4/2004 |
| KR | 20040033993 | 4/2004 |
| KR | 20040039868 | 5/2004 |
| KR | 20040040296 | 5/2004 |
| KR | 20040042475 | 5/2004 |
| KR | 20040044624 | 5/2004 |
| KR | 100437890 | 6/2004 |
| KR | 20040054416 | 6/2004 |
| KR | 20040058969 | 7/2004 |
| KR | 20040062802 | 7/2004 |
| KR | 20040064855 | 7/2004 |
| KR | 20040066724 | 7/2004 |
| KR | 20040068864 | 8/2004 |
| KR | 20040070840 | 8/2004 |
| KR | 20040076308 | 9/2004 |
| KR | 20040086994 | 10/2004 |
| KR | 20040102386 | 12/2004 |
| KR | 20050008245 | 1/2005 |
| KR | 20050011313 | 1/2005 |
| KR | 20050012505 | 2/2005 |
| KR | 20050014448 | 2/2005 |
| KR | 20050015293 | 2/2005 |
| KR | 20050015526 | 2/2005 |
| KR | 20050015745 | 2/2005 |
| KR | 20050018370 | 2/2005 |
| KR | 20050023950 | 3/2005 |
| KR | 20050028537 | 3/2005 |
| KR | 20050033308 | 4/2005 |
| KR | 101006660 | 9/2005 |
| KR | 1020050095463 | 9/2005 |
| KR | 100547739 | 1/2006 |
| KR | 20060023957 | 3/2006 |
| KR | 1020060019715 | 3/2006 |
| KR | 100645746 | 5/2006 |
| KR | 20060054877 | 5/2006 |
| KR | 100612890 | 8/2006 |
| KR | 100633792 | 10/2006 |
| KR | 100646966 | 11/2006 |
| KR | 20060119077 | 11/2006 |
| KR | 20060119236 | 11/2006 |
| KR | 20060120318 | 11/2006 |
| KR | 20060121595 | 11/2006 |
| KR | 100660125 | 12/2006 |
| KR | 100663528 | 1/2007 |
| KR | 100672377 | 1/2007 |
| KR | 20070002590 | 1/2007 |
| KR | 20070005263 | 1/2007 |
| KR | 20070005553 | 1/2007 |
| KR | 20070009380 | 1/2007 |
| KR | 100677913 | 2/2007 |

(56) References Cited

FOREIGN PATENT DOCUMENTS

| | | |
|---|---|---|
| KR | 20070028201 | 3/2007 |
| KR | 100729813 | 6/2007 |
| KR | 20070067650 | 6/2007 |
| KR | 100743171 | 7/2007 |
| KR | 100743254 | 7/2007 |
| KR | 20070068501 | 7/2007 |
| KR | 20070078477 | 8/2007 |
| KR | 20070082960 | 8/2007 |
| KR | 20070087513 | 8/2007 |
| KR | 20070091486 | 9/2007 |
| KR | 100766953 | 10/2007 |
| KR | 100771364 | 10/2007 |
| KR | 20070104957 | 10/2007 |
| KR | 100777428 | 11/2007 |
| KR | 20070115754 | 12/2007 |
| KR | 20070122344 | 12/2007 |
| KR | 20070122345 | 12/2007 |
| KR | 100802525 | 2/2008 |
| KR | 20080013314 | 2/2008 |
| KR | 20080015099 | 2/2008 |
| KR | 20080015100 | 2/2008 |
| KR | 20080015973 | 2/2008 |
| KR | 20080018407 | 2/2008 |
| KR | 100822053 | 4/2008 |
| KR | 20080045551 | 5/2008 |
| KR | 100841243 | 6/2008 |
| KR | 20080053057 | 6/2008 |
| KR | 20080054596 | 6/2008 |
| KR | 100846192 | 7/2008 |
| KR | 20080059882 | 7/2008 |
| KR | 20080069007 | 7/2008 |
| KR | 100854932 | 8/2008 |
| KR | 20080071070 | 8/2008 |
| KR | 20080078315 | 8/2008 |
| KR | 100866177 | 10/2008 |
| KR | 100866475 | 11/2008 |
| KR | 100866476 | 11/2008 |
| KR | 100866573 | 11/2008 |
| KR | 100870724 | 11/2008 |
| KR | 20080096918 | 11/2008 |
| KR | 20080098409 | 11/2008 |
| KR | 100871916 | 12/2008 |
| KR | 20080112331 | 12/2008 |
| KR | 20090003899 | 1/2009 |
| KR | 20090018486 | 2/2009 |
| KR | 20090020864 | 2/2009 |
| KR | 100888554 | 3/2009 |
| KR | 20090036734 | 4/2009 |
| KR | 100897170 | 5/2009 |
| KR | 20090052526 | 5/2009 |
| KR | 100901784 | 6/2009 |
| KR | 100903348 | 6/2009 |
| KR | 20090089931 | 8/2009 |
| KR | 100922497 | 10/2009 |
| KR | 20090105424 | 10/2009 |
| KR | 100932752 | 12/2009 |
| KR | 100935495 | 1/2010 |
| KR | 20100006652 | 1/2010 |
| KR | 2010022327 | 3/2010 |
| KR | 20100039170 | 4/2010 |
| KR | 100958030 | 5/2010 |
| KR | 20100059681 | 6/2010 |
| KR | 20100070116 | 6/2010 |
| KR | 20100070119 | 6/2010 |
| KR | 20100072994 | 7/2010 |
| KR | 100977516 | 8/2010 |
| KR | 2010091758 | 8/2010 |
| KR | 20100089125 | 8/2010 |
| KR | 20100090521 | 8/2010 |
| KR | 20100091758 | 8/2010 |
| KR | 20100098958 | 9/2010 |
| KR | 100985816 | 10/2010 |
| KR | 100990904 | 11/2010 |
| KR | 20100123021 | 11/2010 |
| KR | 1006660 | 1/2011 |
| KR | 20110006437 | 1/2011 |
| KR | 20110011264 | 2/2011 |
| KR | 2011019994 | 3/2011 |
| KR | 2011024290 | 3/2011 |
| KR | 1111167 | 2/2012 |
| WO | WO 03/093963 | 11/2003 |
| WO | WO 2005/002228 | 1/2005 |
| WO | WO 2005/088846 | 9/2005 |
| WO | WO 2006/112866 | 10/2006 |
| WO | WO 2007/006242 | 1/2007 |
| WO | WO 2009/122114 | 10/2009 |
| WO | WO 2010/005152 | 1/2010 |
| WO | WO 2010/033142 | 3/2010 |

* cited by examiner

LINE BASED IMAGE PROCESSING AND FLEXIBLE MEMORY SYSTEM

CROSS-REFERENCE TO RELATED APPLICATIONS

This application is a continuation of International Patent Application No. PCT/US2012/41756 filed Jun. 8, 2012 which claims priority to U.S. Provisional Patent Application No. 61/646,750 filed May 14, 2012 and entitled "LINE BASED IMAGE PROCESSING" which are both hereby incorporated by reference in their entirety. International Patent Application No. PCT/US2012/41756 claims the benefit of U.S. Provisional Patent Application No. 61/646,732 filed May 14, 2012 and entitled "FLEXIBLE MEMORY SYSTEM" which is hereby incorporated by reference in its entirety.

International Patent Application No. PCT/US2012/41756 claims the benefit of U.S. Provisional Patent Application No. 61/545,056 filed Oct. 7, 2011 and entitled "NON-UNIFORMITY CORRECTION TECHNIQUES FOR INFRARED IMAGING DEVICES" which is hereby incorporated by reference in its entirety.

International Patent Application No. PCT/US2012/41756 claims the benefit of U.S. Provisional Patent Application No. 61/495,873 filed Jun. 10, 2011 and entitled "INFRARED CAMERA PACKAGING SYSTEMS AND METHODS" which is hereby incorporated by reference in its entirety.

International Patent Application No. PCT/US2012/41756 claims the benefit of U.S. Provisional Patent Application No. 61/495,879 filed Jun. 10, 2011 and entitled "INFRARED CAMERA SYSTEM ARCHITECTURES" which is hereby incorporated by reference in its entirety.

International Patent Application No. PCT/US2012/41756 claims the benefit of U.S. Provisional Patent Application No. 61/495,888 filed Jun. 10, 2011 and entitled "INFRARED CAMERA CALIBRATION TECHNIQUES" which is hereby incorporated by reference in its entirety.

TECHNICAL FIELD

One or more embodiments of the invention relate generally to thermal imaging devices and more particularly, for example, to the processing of thermal images.

BACKGROUND

Conventional image processing typically requires significant processing power and substantial memory resources. In this regard, a captured image (e.g., an image frame) may include a large number of pixels, each of which may have many bits or bytes of associated data. As a result, large amounts of memory may be required to store the captured image, and operations may be required to be performed on all of the many pixels to process even a single captured image. These difficulties are compounded in realtime applications where a stream of images may need to be captured and processed without introducing significant latency or other delays.

Unfortunately, conventional frame based approaches to image processing are often problematic. For example, a powerful processor may be required to satisfactorily process an entire image. In addition, such a processor may rely on a centralized memory system to repeatedly read and write image data to a large memory block over a shared memory bus. Such approaches can lead to processing delays and bottlenecks in the use and operation of the processor and the memory system.

SUMMARY

In accordance with embodiments further described herein, various techniques are provided to implement line based processing of thermal images. In one embodiment, individual lines of a thermal image frame may be provided to an image processing pipeline. Image processing operations may be performed on the individual lines in stages of the image processing pipeline.

Various techniques are also provided to provide a flexible memory system. In one embodiment, the memory system may be used to buffer the individual lines in pipeline stages of the image processing pipeline. In another embodiment, the memory system may be used to send and receive data between various components (e.g., processing devices or other components) without relying on a single shared bus between the components. For example, data transfers may be performed between different components and different memories of the memory system using a switch fabric to route data over different buses simultaneously or substantially simultaneously.

In another embodiment, the memory system may be implemented to support data transfers using different clocks of the various components, without requiring the components and the memory system to all be synchronized to the same clock source.

In another embodiment, a method includes receiving a thermal image frame comprising a plurality of individual lines, wherein each individual line comprises substantially an entire row or column of thermal image data captured by a plurality of infrared sensors; providing each individual line of the thermal image frame to a line based image processing pipeline; performing image processing operations on the individual lines in stages of the image processing pipeline; and buffering the individual lines in the pipeline stages.

In another embodiment, an infrared imaging module includes a sensor input block adapted to receive a thermal image frame comprising a plurality of individual lines, wherein each individual line comprises substantially an entire row or column of thermal image data captured by a plurality of infrared sensors; a processing device comprising a line based image processing pipeline adapted to perform image processing operations on the individual lines in stages of the image processing pipeline; and a memory system adapted to buffer the individual lines in the pipeline stages.

In another embodiment, a device includes a plurality of components adapted to transfer thermal image data; a plurality of buses connected to the components; and a memory system connected to the components by the buses, the memory system comprising a plurality of memory buffers, each memory buffer comprising: a memory block comprising a single interface adapted to support a single read or write operation at a time, a plurality of ports, wherein each port is adapted to communicate with a corresponding one of the components over a corresponding one of the buses, and a switch fabric block adapted to selectively couple one of the ports with the memory block to permit transfer of at least a portion of the thermal image data between the corresponding one of the components and the memory block through the coupled port and the single interface.

In another embodiment, a method of operating a memory system and a plurality of components connected to the memory system by corresponding buses includes operating a switch fabric to couple a first port of a memory buffer with a memory block of the memory buffer, wherein the memory block comprises a single interface adapted to support a single read or write operation at a time, wherein the memory buffer is part of the memory system; transferring first thermal image data between a first one of the components and the memory block over a first one of the buses, through the first port, and through the single interface; subsequently operating the switch fabric to couple a second port of the memory buffer with the memory block; and transferring second thermal image data between a second one of the components and the memory block over a second one of the buses, through the second port, and through the single interface.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1:
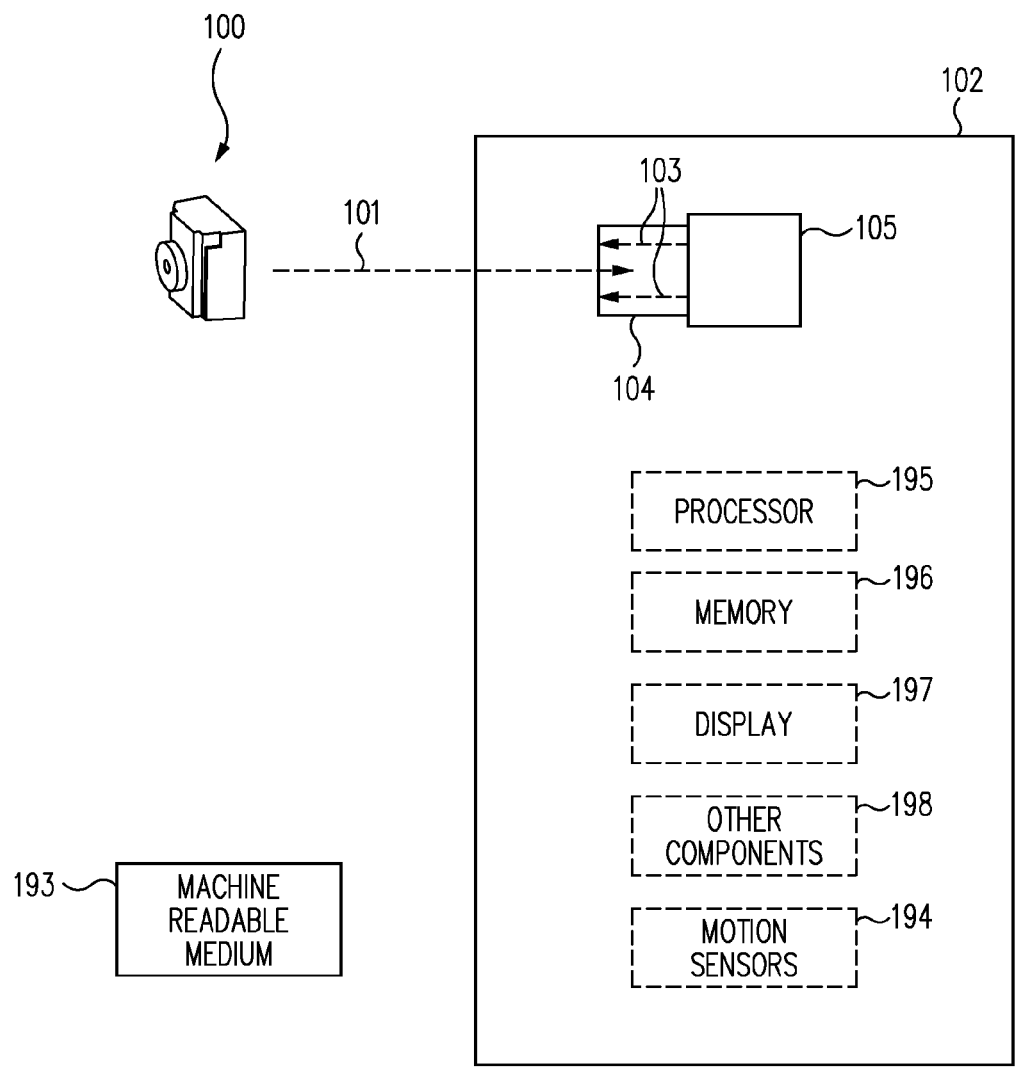
FIG. 1 illustrates an infrared imaging module configured to be implemented in a host device in accordance with an embodiment of the disclosure.

FIG. 1 illustrates an infrared imaging module 100 (e.g., an infrared camera or an infrared imaging device) configured to be implemented in a host device 102 in accordance with an embodiment of the disclosure. Infrared imaging module 100 may be implemented, for one or more embodiments, with a small form factor and in accordance with wafer level packaging techniques or other packaging techniques.

In one embodiment, infrared imaging module 100 may be configured to be implemented in a small portable host device 102, such as a mobile telephone, a tablet computing device, a laptop computing device, a personal digital assistant, a visible light camera, a music player, or any other appropriate mobile device. In this regard, infrared imaging module 100 may be used to provide infrared imaging features to host device 102. For example, infrared imaging module 100 may be configured to capture, process, and/or otherwise manage infrared images and provide such infrared images to host device 102 for use in any desired fashion (e.g., for further processing, to store in memory, to display, to use by various applications running on host device 102, to export to other devices, or other uses).

In various embodiments, infrared imaging module 100 may be configured to operate at low voltage levels and over a wide temperature range. For example, in one embodiment, infrared imaging module 100 may operate using a power supply of approximately 2.4 volts, 2.5 volts, 2.8 volts, or lower voltages, and operate over a temperature range of approximately −20 degrees C. to approximately +60 degrees C. (e.g., providing a suitable dynamic range and performance over an environmental temperature range of approximately 80 degrees C.). In one embodiment, by operating infrared imaging module 100 at low voltage levels, infrared imaging module 100 may experience reduced amounts of self heating in comparison with other types of infrared imaging devices. As a result, infrared imaging module 100 may be operated with reduced measures to compensate for such self heating.

Figure 2:
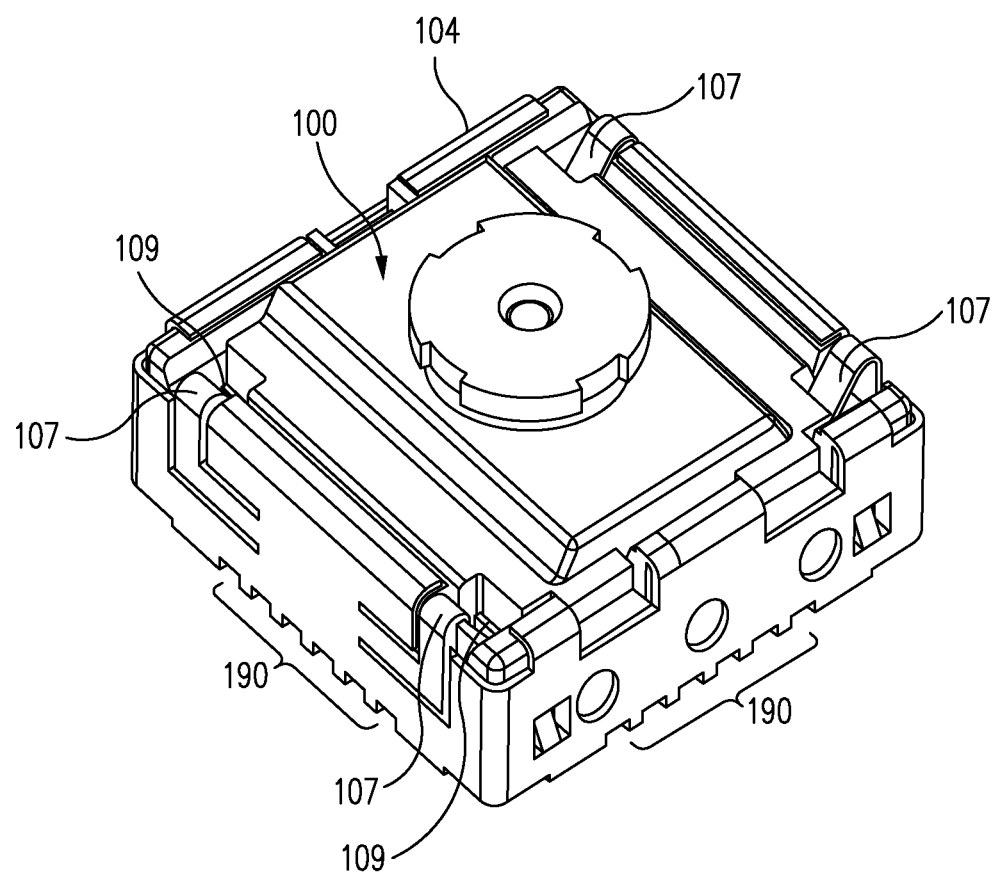
FIG. 2 illustrates an assembled infrared imaging module in accordance with an embodiment of the disclosure.

As shown in FIG. 1, host device 102 may include a socket 104, a shutter 105, motion sensors 194, a processor 195, a memory 196, a display 197, and/or other components 198. Socket 104 may be configured to receive infrared imaging module 100 as identified by arrow 101. In this regard, FIG. 2 illustrates infrared imaging module 100 assembled in socket 104 in accordance with an embodiment of the disclosure.

Motion sensors 194 may be implemented by one or more accelerometers, gyroscopes, or other appropriate devices that may be used to detect movement of host device 102. Motion sensors 194 may be monitored by and provide information to processing module 160 or processor 195 to detect motion. In various embodiments, motion sensors 194 may be implemented as part of host device 102 (as shown in FIG. 1), infrared imaging module 100, or other devices attached to or otherwise interfaced with host device 102.

Processor 195 may be implemented as any appropriate processing device (e.g., logic device, microcontroller, processor, application specific integrated circuit (ASIC), or other device) that may be used by host device 102 to execute appropriate instructions, such as software instructions provided in memory 196. Display 197 may be used to display captured and/or processed infrared images and/or other images, data, and information. Other components 198 may be used to implement any features of host device 102 as may be desired for various applications (e.g., clocks, temperature sensors, a visible light camera, or other components). In addition, a machine readable medium 193 may be provided for storing non-transitory instructions for loading into memory 196 and execution by processor 195.

In various embodiments, infrared imaging module 100 and socket 104 may be implemented for mass production to facilitate high volume applications, such as for implementation in mobile telephones or other devices (e.g., requiring small form factors). In one embodiment, the combination of infrared imaging module 100 and socket 104 may exhibit overall dimensions of approximately 8.5 mm by 8.5 mm by 5.9 mm while infrared imaging module 100 is installed in socket 104.

Figure 3:
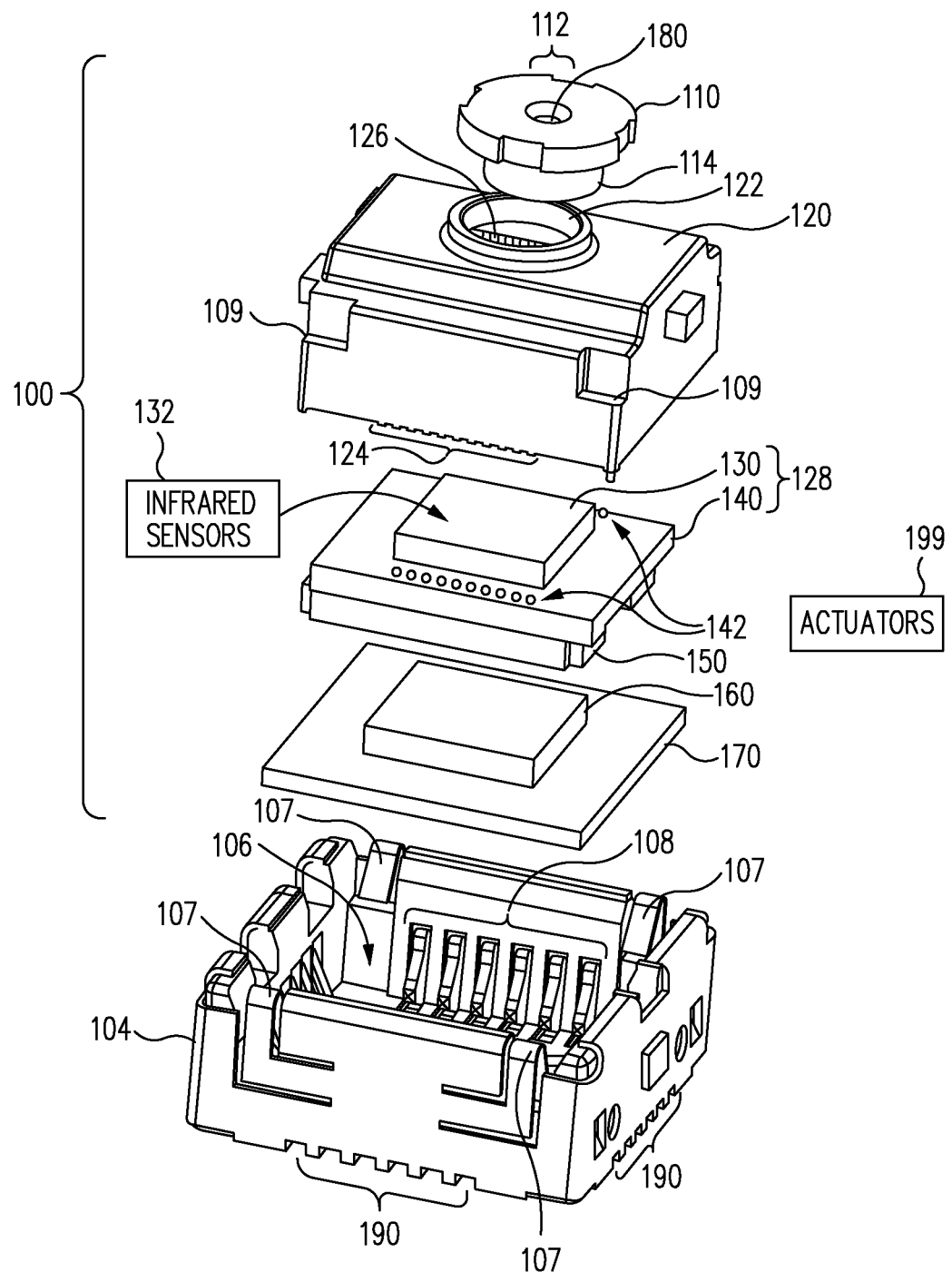
FIG. 3 illustrates an exploded view of an infrared imaging module juxtaposed over a socket in accordance with an embodiment of the disclosure.

FIG. 3 illustrates an exploded view of infrared imaging module 100 juxtaposed over socket 104 in accordance with an embodiment of the disclosure. Infrared imaging module 100 may include a lens barrel 110, a housing 120, an infrared sensor assembly 128, a circuit board 170, a base 150, and a processing module 160.

Lens barrel 110 may at least partially enclose an optical element 180 (e.g., a lens) which is partially visible in FIG. 3 through an aperture 112 in lens barrel 110. Lens barrel 110 may include a substantially cylindrical extension 114 which may be used to interface lens barrel 110 with an aperture 122 in housing 120.

Infrared sensor assembly 128 may be implemented, for example, with a cap 130 (e.g., a lid) mounted on a substrate 140. Infrared sensor assembly 128 may include a plurality of infrared sensors 132 (e.g., infrared detectors) implemented in an array or other fashion on substrate 140 and covered by cap 130. For example, in one embodiment, infrared sensor assembly 128 may be implemented as a focal plane array (FPA). Such a focal plane array may be implemented, for example, as a vacuum package assembly (e.g., sealed by cap 130 and substrate 140). In one embodiment, infrared sensor assembly 128 may be implemented as a wafer level package (e.g., infrared sensor assembly 128 may be singulated from a set of vacuum package assemblies provided on a wafer). In one embodiment, infrared sensor assembly 128 may be implemented to operate using a power supply of approximately 2.4 volts, 2.5 volts, 2.8 volts, or similar voltages.

Infrared sensors 132 may be configured to detect infrared radiation (e.g., infrared energy) from a target scene including, for example, mid wave infrared wave bands (MWIR), long wave infrared wave bands (LWIR), and/or other thermal imaging bands as may be desired in particular implementations. In one embodiment, infrared sensor assembly 128 may be provided in accordance with wafer level packaging techniques.

Infrared sensors 132 may be implemented, for example, as microbolometers or other types of thermal imaging infrared sensors arranged in any desired array pattern to provide a plurality of pixels. In one embodiment, infrared sensors 132 may be implemented as vanadium oxide (VOx) detectors with a 17 μm pixel pitch. In various embodiments, arrays of approximately 32 by 32 infrared sensors 132, approximately 64 by 64 infrared sensors 132, approximately 80 by 64 infrared sensors 132, or other array sizes may be used.

Substrate 140 may include various circuitry including, for example, a read out integrated circuit (ROIC) with dimensions less than approximately 5.5 mm by 5.5 mm in one embodiment. Substrate 140 may also include bond pads 142 that may be used to contact complementary connections positioned on inside surfaces of housing 120 when infrared imaging module 100 is assembled as shown in FIGS. 5A, 5B, and 5C. In one embodiment, the ROIC may be implemented with low-dropout regulators (LDO) to perform voltage regulation to reduce power supply noise introduced to infrared sensor assembly 128 and thus provide an improved power supply rejection ratio (PSRR). Moreover, by implementing the LDO with the ROTC (e.g., within a wafer level package), less die area may be consumed and fewer discrete die (or chips) are needed.

Figure 4:
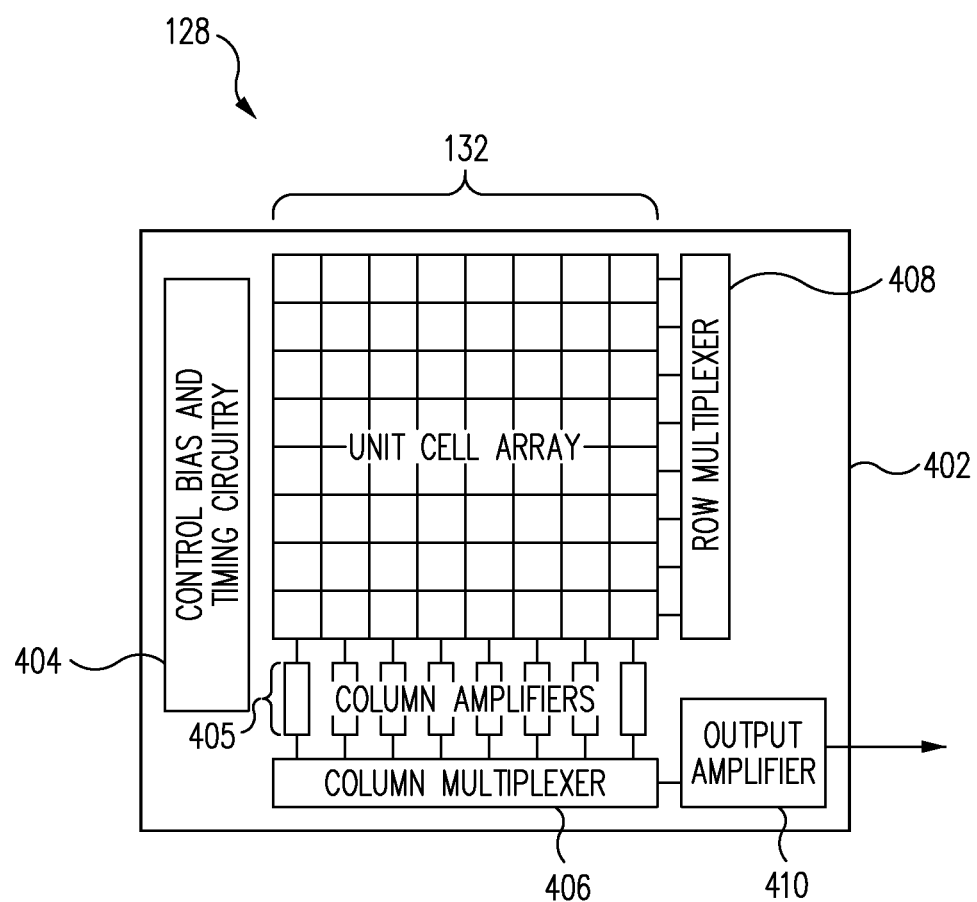
FIG. 4 illustrates a block diagram of an infrared sensor assembly including an array of infrared sensors in accordance with an embodiment of the disclosure.

FIG. 4 illustrates a block diagram of infrared sensor assembly 128 including an array of infrared sensors 132 in accordance with an embodiment of the disclosure. In the illustrated embodiment, infrared sensors 132 are provided as part of a unit cell array of a ROTC 402. ROTC 402 includes bias generation and timing control circuitry 404, column amplifiers 405, a column multiplexer 406, a row multiplexer 408, and an output amplifier 410. Image frames (e.g., thermal images) captured by infrared sensors 132 may be provided by output amplifier 410 to processing module 160, processor 195, and/or any other appropriate components to perform various processing techniques described herein. Although an 8 by 8 array is shown in FIG. 4, any desired array configuration may be used in other embodiments. Further descriptions of ROICs and infrared sensors (e.g., microbolometer circuits) may be found in U.S. Pat. No. 6,028,309 issued Feb. 22, 2000, which is incorporated herein by reference in its entirety.

Infrared sensor assembly 128 may capture images (e.g., image frames) and provide such images from its ROTC at various rates. Processing module 160 may be used to perform appropriate processing of captured infrared images and may be implemented in accordance with any appropriate architecture. In one embodiment, processing module 160 may be implemented as an ASIC. In this regard, such an ASIC may be configured to perform image processing with high performance and/or high efficiency. In another embodiment, processing module 160 may be implemented with a general purpose central processing unit (CPU) which may be configured to execute appropriate software instructions to perform image processing, coordinate and perform image processing with various image processing blocks, coordinate interfacing between processing module 160 and host device 102, and/or other operations. In yet another embodiment, processing module 160 may be implemented with a field programmable gate array (FPGA). Processing module 160 may be implemented with other types of processing and/or logic circuits in other embodiments as would be understood by one skilled in the art.

In these and other embodiments, processing module 160 may also be implemented with other components where appropriate, such as, volatile memory, non-volatile memory, and/or one or more interfaces (e.g., infrared detector interfaces, inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces).

In some embodiments, infrared imaging module 100 may further include one or more actuators 199 which may be used to adjust the focus of infrared image frames captured by infrared sensor assembly 128. For example, actuators 199 may be used to move optical element 180, infrared sensors 132, and/or other components relative to each other to selectively focus and defocus infrared image frames in accordance with techniques described herein. Actuators 199 may be implemented in accordance with any type of motion-inducing apparatus or mechanism, and may positioned at any location within or external to infrared imaging module 100 as appropriate for different applications.

When infrared imaging module 100 is assembled, housing 120 may substantially enclose infrared sensor assembly 128, base 150, and processing module 160. Housing 120 may facilitate connection of various components of infrared imaging module 100. For example, in one embodiment, housing 120 may provide electrical connections 126 to connect various components as further described.

Electrical connections 126 (e.g., conductive electrical paths, traces, or other types of connections) may be electrically connected with bond pads 142 when infrared imaging module 100 is assembled. In various embodiments, electrical connections 126 may be embedded in housing 120, provided on inside surfaces of housing 120, and/or otherwise provided by housing 120. Electrical connections 126 may terminate in connections 124 protruding from the bottom surface of housing 120 as shown in FIG. 3. Connections 124 may connect with circuit board 170 when infrared imaging module 100 is assembled (e.g., housing 120 may rest atop circuit board 170 in various embodiments). Processing module 160 may be electrically connected with circuit board 170 through appropriate electrical connections. As a result, infrared sensor assembly 128 may be electrically connected with processing module 160 through, for example, conductive electrical paths provided by: bond pads 142, complementary connections on inside surfaces of housing 120, electrical connections 126 of housing 120, connections 124, and circuit board 170. Advantageously, such an arrangement may be implemented without requiring wire bonds to be provided between infrared sensor assembly 128 and processing module 160.

In various embodiments, electrical connections 126 in housing 120 may be made from any desired material (e.g., copper or any other appropriate conductive material). In one embodiment, electrical connections 126 may aid in dissipating heat from infrared imaging module 100.

Other connections may be used in other embodiments. For example, in one embodiment, sensor assembly 128 may be attached to processing module 160 through a ceramic board that connects to sensor assembly 128 by wire bonds and to processing module 160 by a ball grid array (BGA). In another embodiment, sensor assembly 128 may be mounted directly on a rigid flexible board and electrically connected with wire bonds, and processing module 160 may be mounted and connected to the rigid flexible board with wire bonds or a BGA.

The various implementations of infrared imaging module 100 and host device 102 set forth herein are provided for purposes of example, rather than limitation. In this regard, any of the various techniques described herein may be applied to any infrared camera system, infrared imager, or other device for performing infrared/thermal imaging.

Substrate 140 of infrared sensor assembly 128 may be mounted on base 150. In various embodiments, base 150 (e.g., a pedestal) may be made, for example, of copper formed by metal injection molding (MIM) and provided with a black oxide or nickel-coated finish. In various embodiments, base 150 may be made of any desired material, such as for example zinc, aluminum, or magnesium, as desired for a given application and may be formed by any desired applicable process, such as for example aluminum casting, MIM, or zinc rapid casting, as may be desired for particular applications. In various embodiments, base 150 may be implemented to provide structural support, various circuit paths, thermal heat sink properties, and other features where appropriate. In one embodiment, base 150 may be a multi-layer structure implemented at least in part using ceramic material.

In various embodiments, circuit board 170 may receive housing 120 and thus may physically support the various components of infrared imaging module 100. In various embodiments, circuit board 170 may be implemented as a printed circuit board (e.g., an FR4 circuit board or other types of circuit boards), a rigid or flexible interconnect (e.g., tape or other type of interconnects), a flexible circuit substrate, a flexible plastic substrate, or other appropriate structures. In various embodiments, base 150 may be implemented with the various features and attributes described for circuit board 170, and vice versa.

Socket 104 may include a cavity 106 configured to receive infrared imaging module 100 (e.g., as shown in the assembled view of FIG. 2). Infrared imaging module 100 and/or socket 104 may include appropriate tabs, arms, pins, fasteners, or any other appropriate engagement members which may be used to secure infrared imaging module 100 to or within socket 104 using friction, tension, adhesion, and/or any other appropriate manner. Socket 104 may include engagement members 107 that may engage surfaces 109 of housing 120 when infrared imaging module 100 is inserted into a cavity 106 of socket 104. Other types of engagement members may be used in other embodiments.

Infrared imaging module 100 may be electrically connected with socket 104 through appropriate electrical connections (e.g., contacts, pins, wires, or any other appropriate connections). For example, socket 104 may include electrical connections 108 which may contact corresponding electrical connections of infrared imaging module 100 (e.g., interconnect pads, contacts, or other electrical connections on side or bottom surfaces of circuit board 170, bond pads 142 or other electrical connections on base 150, or other connections). Electrical connections 108 may be made from any desired material (e.g., copper or any other appropriate conductive material). In one embodiment, electrical connections 108 may be mechanically biased to press against electrical connections of infrared imaging module 100 when infrared imaging module 100 is inserted into cavity 106 of socket 104. In one embodiment, electrical connections 108 may at least partially secure infrared imaging module 100 in socket 104. Other types of electrical connections may be used in other embodiments.

Socket 104 may be electrically connected with host device 102 through similar types of electrical connections. For example, in one embodiment, host device 102 may include electrical connections (e.g., soldered connections, snap-in connections, or other connections) that connect with electrical connections 108 passing through apertures 190. In various embodiments, such electrical connections may be made to the sides and/or bottom of socket 104.

Various components of infrared imaging module 100 may be implemented with flip chip technology which may be used to mount components directly to circuit boards without the additional clearances typically needed for wire bond connections. Flip chip connections may be used, as an example, to reduce the overall size of infrared imaging module 100 for use in compact small form factor applications. For example, in one embodiment, processing module 160 may be mounted to circuit board 170 using flip chip connections. For example, infrared imaging module 100 may be implemented with such flip chip configurations.

In various embodiments, infrared imaging module 100 and/or associated components may be implemented in accordance with various techniques (e.g., wafer level packaging techniques) as set forth in U.S. patent application Ser. No. 12/844,124 filed Jul. 27, 2010, and U.S. Provisional Patent Application No. 61/469,651 filed Mar. 30, 2011, which are incorporated herein by reference in their entirety. Furthermore, in accordance with one or more embodiments, infrared imaging module 100 and/or associated components may be implemented, calibrated, tested, and/or used in accordance with various techniques, such as for example as set forth in U.S. Pat. No. 7,470,902 issued Dec. 30, 2008, U.S. Pat. No. 6,028,309 issued Feb. 22, 2000, U.S. Pat. No. 6,812,465 issued Nov. 2, 2004, U.S. Pat. No. 7,034,301 issued Apr. 25, 2006, U.S. Pat. No. 7,679,048 issued Mar. 16, 2010, U.S. Pat. No. 7,470,904 issued Dec. 30, 2008, U.S. patent application Ser. No. 12/202,880 filed Sep. 2, 2008, and U.S. patent application Ser. No. 12/202,896 filed Sep. 2, 2008, which are incorporated herein by reference in their entirety.

Referring again to FIG. 1, in various embodiments, host device 102 may include shutter 105. In this regard, shutter 105 may be selectively positioned over socket 104 (e.g., as identified by arrows 103) while infrared imaging module 100 is installed therein. In this regard, shutter 105 may be used, for example, to protect infrared imaging module 100 when not in use. Shutter 105 may also be used as a temperature reference as part of a calibration process (e.g., a NUC process or other calibration processes) for infrared imaging module 100 as would be understood by one skilled in the art.

In various embodiments, shutter 105 may be made from various materials such as, for example, polymers, glass, aluminum (e.g., painted or anodized) or other materials. In various embodiments, shutter 105 may include one or more coatings to selectively filter electromagnetic radiation and/or adjust various optical properties of shutter 105 (e.g., a uniform blackbody coating or a reflective gold coating).

In another embodiment, shutter 105 may be fixed in place to protect infrared imaging module 100 at all times. In this case, shutter 105 or a portion of shutter 105 may be made from appropriate materials (e.g., polymers or infrared transmitting materials such as silicon, germanium, zinc selenide, or chalcogenide glasses) that do not substantially filter desired infrared wavelengths. In another embodiment, a shutter may be implemented as part of infrared imaging module 100 (e.g., within or as part of a lens barrel or other components of infrared imaging module 100), as would be understood by one skilled in the art.

Alternatively, in another embodiment, a shutter (e.g., shutter 105 or other type of external or internal shutter) need not be provided, but rather a NUC process or other type of calibration may be performed using shutterless techniques. In another embodiment, a NUC process or other type of calibration using shutterless techniques may be performed in combination with shutter-based techniques.

Infrared imaging module 100 and host device 102 may be implemented in accordance with any of the various techniques set forth in U.S. Provisional Patent Application No. 61/495,873 filed Jun. 10, 2011, U.S. Provisional Patent Application No. 61/495,879 filed Jun. 10, 2011, and U.S. Provisional Patent Application No. 61/495,888 filed Jun. 10, 2011, which are incorporated herein by reference in their entirety.

In various embodiments, the components of host device 102 and/or infrared imaging module 100 may be implemented as a local or distributed system with components in communication with each other over wired and/or wireless networks. Accordingly, the various operations identified in this disclosure may be performed by local and/or remote components as may be desired in particular implementations.

Figure 5:
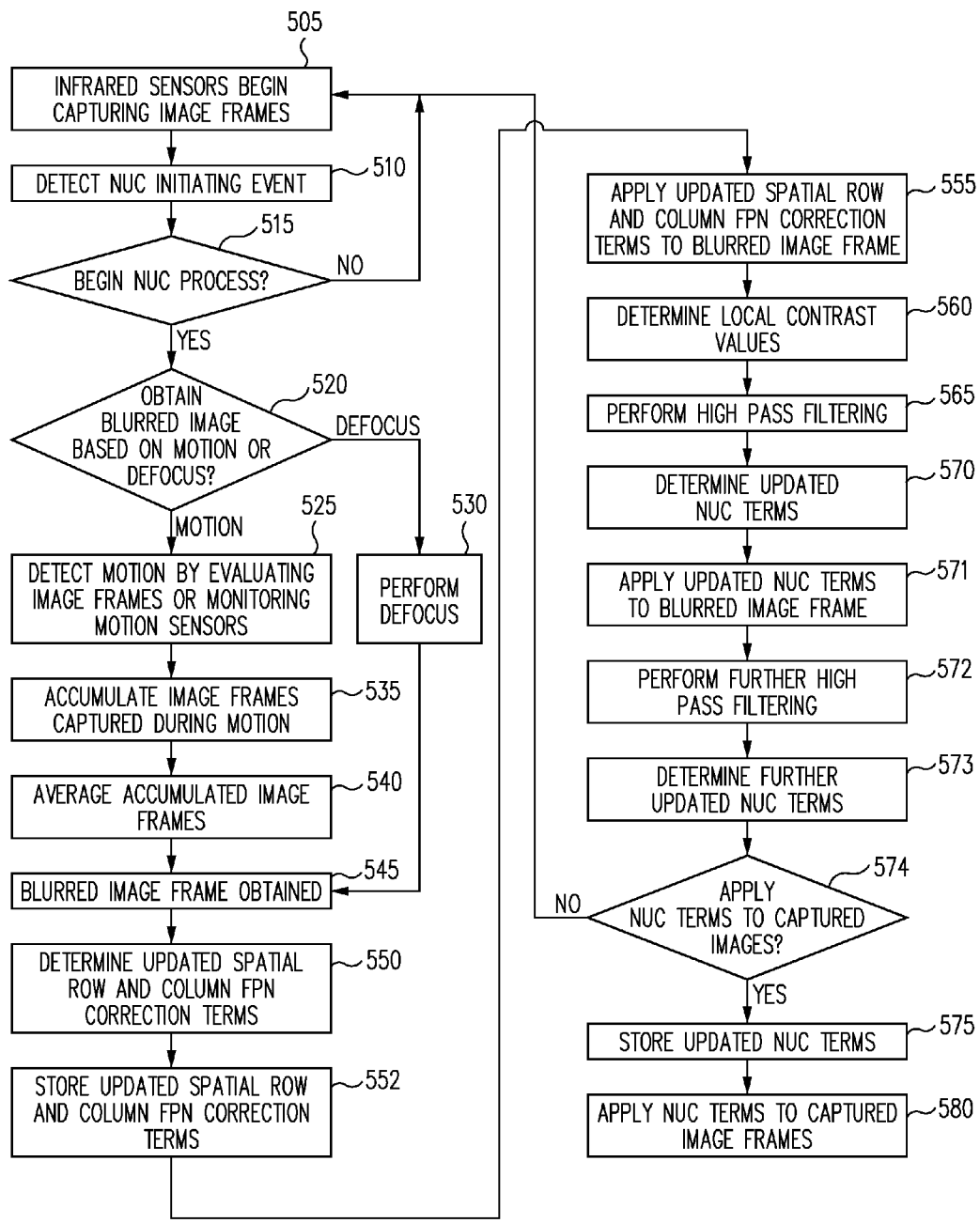
FIG. 5 illustrates a flow diagram of various operations to determine non-uniformity correction (NUC) terms in accordance with an embodiment of the disclosure.

FIG. 5 illustrates a flow diagram of various operations to determine NUC terms in accordance with an embodiment of the disclosure. In some embodiments, the operations of FIG. 5 may be performed by processing module 160 or processor 195 (both also generally referred to as a processor) operating on image frames captured by infrared sensors 132.

In block 505, infrared sensors 132 begin capturing image frames of a scene. Typically, the scene will be the real world environment in which host device 102 is currently located. In this regard, shutter 105 (if optionally provided) may be opened to permit infrared imaging module to receive infrared radiation from the scene. Infrared sensors 132 may continue capturing image frames during all operations shown in FIG. 5. In this regard, the continuously captured image frames may be used for various operations as further discussed. In one embodiment, the captured image frames may be temporally filtered (e.g., in accordance with the process of block 826 further described herein with regard to FIG. 8) and be processed by other terms (e.g., factory gain terms 812, factory offset terms 816, previously determined NUC terms 817, column FPN terms 820, and row FPN terms 824 as further described herein with regard to FIG. 8) before they are used in the operations shown in FIG. 5.

In block 510, a NUC process initiating event is detected. In one embodiment, the NUC process may be initiated in response to physical movement of host device 102. Such movement may be detected, for example, by motion sensors 194 which may be polled by a processor. In one example, a user may move host device 102 in a particular manner, such as by intentionally waving host device 102 back and forth in an "erase" or "swipe" movement. In this regard, the user may move host device 102 in accordance with a predetermined speed and direction (velocity), such as in an up and down, side to side, or other pattern to initiate the NUC process. In this example, the use of such movements may permit the user to intuitively operate host device 102 to simulate the "erasing" of noise in captured image frames.

In another example, a NUC process may be initiated by host device 102 if motion exceeding a threshold value is exceeded (e.g., motion greater than expected for ordinary use). It is contemplated that any desired type of spatial translation of host device 102 may be used to initiate the NUC process.

In yet another example, a NUC process may be initiated by host device 102 if a minimum time has elapsed since a previously performed NUC process. In a further example, a NUC process may be initiated by host device 102 if infrared imaging module 100 has experienced a minimum temperature change since a previously performed NUC process. In a still further example, a NUC process may be continuously initiated and repeated.

In block 515, after a NUC process initiating event is detected, it is determined whether the NUC process should actually be performed. In this regard, the NUC process may be selectively initiated based on whether one or more additional conditions are met. For example, in one embodiment, the NUC process may not be performed unless a minimum time has elapsed since a previously performed NUC process. In another embodiment, the NUC process may not be performed unless infrared imaging module 100 has experienced a minimum temperature change since a previously performed NUC process. Other criteria or conditions may be used in other embodiments. If appropriate criteria or conditions have been met, then the flow diagram continues to block 520. Otherwise, the flow diagram returns to block 505.

In the NUC process, blurred image frames may be used to determine NUC terms which may be applied to captured image frames to correct for FPN. As discussed, in one embodiment, the blurred image frames may be obtained by accumulating multiple image frames of a moving scene (e.g., captured while the scene and/or the thermal imager is in motion). In another embodiment, the blurred image frames may be obtained by defocusing an optical element or other component of the thermal imager.

Accordingly, in block 520 a choice of either approach is provided. If the motion-based approach is used, then the flow diagram continues to block 525. If the defocus-based approach is used, then the flow diagram continues to block 530.

Referring now to the motion-based approach, in block 525 motion is detected. For example, in one embodiment, motion may be detected based on the image frames captured by infrared sensors 132. In this regard, an appropriate motion detection process (e.g., an image registration process, a frame-to-frame difference calculation, or other appropriate process) may be applied to captured image frames to determine whether motion is present (e.g., whether static or moving image frames have been captured). For example, in one embodiment, it can be determined whether pixels or regions around the pixels of consecutive image frames have changed more than a user defined amount (e.g., a percentage and/or threshold value). If at least a given percentage of pixels have changed by at least the user defined amount, then motion will be detected with sufficient certainty to proceed to block 535.

In another embodiment, motion may be determined on a per pixel basis, wherein only pixels that exhibit significant changes are accumulated to provide the blurred image frame. For example, counters may be provided for each pixel and used to ensure that the same number of pixel values are accumulated for each pixel, or used to average the pixel values based on the number of pixel values actually accumulated for each pixel. Other types of image-based motion detection may be performed such as performing a Radon transform.

In another embodiment, motion may be detected based on data provided by motion sensors 194. In one embodiment, such motion detection may include detecting whether host device 102 is moving along a relatively straight trajectory through space. For example, if host device 102 is moving along a relatively straight trajectory, then it is possible that certain objects appearing in the imaged scene may not be sufficiently blurred (e.g., objects in the scene that may be aligned with or moving substantially parallel to the straight trajectory). Thus, in such an embodiment, the motion detected by motion sensors 194 may be conditioned on host device 102 exhibiting, or not exhibiting, particular trajectories.

In yet another embodiment, both a motion detection process and motion sensors 194 may be used. Thus, using any of these various embodiments, a determination can be made as to whether or not each image frame was captured while at least a portion of the scene and host device 102 were in motion relative to each other (e.g., which may be caused by host device 102 moving relative to the scene, at least a portion of the scene moving relative to host device 102, or both).

It is expected that the image frames for which motion was detected may exhibit some secondary blurring of the captured scene (e.g., blurred thermal image data associated with the scene) due to the thermal time constants of infrared sensors 132 (e.g., microbolometer thermal time constants) interacting with the scene movement.

In block 535, image frames for which motion was detected are accumulated. For example, if motion is detected for a continuous series of image frames, then the image frames of the series may be accumulated. As another example, if motion is detected for only some image frames, then the non-moving image frames may be skipped and not included in the accumulation. Thus, a continuous or discontinuous set of image frames may be selected to be accumulated based on the detected motion.

In block 540, the accumulated image frames are averaged to provide a blurred image frame. Because the accumulated image frames were captured during motion, it is expected that actual scene information will vary between the image frames and thus cause the scene information to be further blurred in the resulting blurred image frame (block 545).

In contrast, FPN (e.g., caused by one or more components of infrared imaging module 100) will remain fixed over at least short periods of time and over at least limited changes in scene irradiance during motion. As a result, image frames captured in close proximity in time and space during motion will suffer from identical or at least very similar FPN. Thus, although scene information may change in consecutive image frames, the FPN will stay essentially constant. By averaging, multiple image frames captured during motion will blur the scene information, but will not blur the FPN. As a result, FPN will remain more clearly defined in the blurred image frame provided in block 545 than the scene information.

In one embodiment, 32 or more image frames are accumulated and averaged in blocks 535 and 540. However, any desired number of image frames may be used in other embodiments, but with generally decreasing correction accuracy as frame count is decreased.

Referring now to the defocus-based approach, in block 530, a defocus operation may be performed to intentionally defocus the image frames captured by infrared sensors 132. For example, in one embodiment, one or more actuators 199 may be used to adjust, move, or otherwise translate optical element 180, infrared sensor assembly 128, and/or other components of infrared imaging module 100 to cause infrared sensors 132 to capture a blurred (e.g., unfocused) image frame of the scene. Other non-actuator based techniques are also contemplated for intentionally defocusing infrared image frames such as, for example, manual (e.g., user-initiated) defocusing.

Although the scene may appear blurred in the image frame, FPN (e.g., caused by one or more components of infrared imaging module 100) will remain unaffected by the defocusing operation. As a result, a blurred image frame of the scene will be provided (block 545) with FPN remaining more clearly defined in the blurred image than the scene information.

In the above discussion, the defocus-based approach has been described with regard to a single captured image frame. In another embodiment, the defocus-based approach may include accumulating multiple image frames while the infrared imaging module 100 has been defocused and averaging the defocused image frames to remove the effects of temporal noise and provide a blurred image frame in block 545.

Thus, it will be appreciated that a blurred image frame may be provided in block 545 by either the motion-based approach or the defocus-based approach. Because much of the scene information will be blurred by either motion, defocusing, or both, the blurred image frame may be effectively considered a low pass filtered version of the original captured image frames with respect to scene information.

In block 550, the blurred image frame is processed to determine updated row and column FPN terms (e.g., if row and column FPN terms have not been previously determined then the updated row and column FPN terms may be new row and column FPN terms in the first iteration of block 550). As used in this disclosure, the terms row and column may be used interchangeably depending on the orientation of infrared sensors 132 and/or other components of infrared imaging module 100.

In one embodiment, block 550 includes determining a spatial FPN correction term for each row of the blurred image frame (e.g., each row may have its own spatial FPN correction term), and also determining a spatial FPN correction term for each column of the blurred image frame (e.g., each column may have its own spatial FPN correction term). Such processing may be used to reduce the spatial and slowly varying (1/f) row and column FPN inherent in thermal imagers caused by, for example, 1/f noise characteristics of amplifiers in ROTC 402 which may manifest as vertical and horizontal stripes in image frames.

Advantageously, by determining spatial row and column FPN terms using the blurred image frame, there will be a reduced risk of vertical and horizontal objects in the actual imaged scene from being mistaken for row and column noise (e.g., real scene content will be blurred while FPN remains unblurred).

Figure 6:
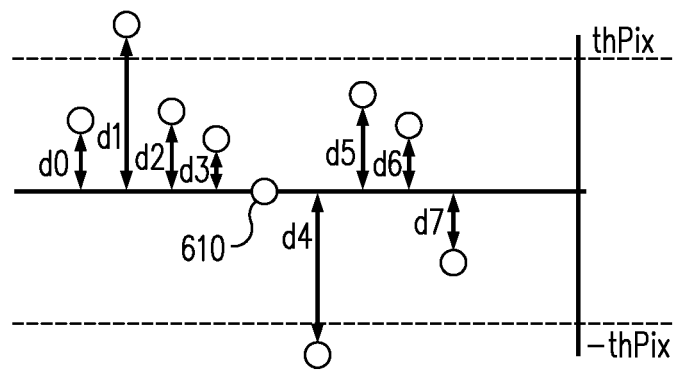
FIG. 6 illustrates differences between neighboring pixels in accordance with an embodiment of the disclosure.

In one embodiment, row and column FPN terms may be determined by considering differences between neighboring pixels of the blurred image frame. For example, FIG. 6 illustrates differences between neighboring pixels in accordance with an embodiment of the disclosure. Specifically, in FIG. 6 a pixel 610 is compared to its 8 nearest horizontal neighbors: d0-d3 on one side and d4-d7 on the other side. Differences between the neighbor pixels can be averaged to obtain an estimate of the offset error of the illustrated group of pixels. An offset error may be calculated for each pixel in a row or column and the average result may be used to correct the entire row or column.

To prevent real scene data from being interpreted as noise, upper and lower threshold values may be used (thPix and −thPix). Pixel values falling outside these threshold values (pixels d1 and d4 in this example) are not used to obtain the offset error. In addition, the maximum amount of row and column FPN correction may be limited by these threshold values.

Further techniques for performing spatial row and column FPN correction processing are set forth in U.S. patent application Ser. No. 12/396,340 filed Mar. 2, 2009 which is incorporated herein by reference in its entirety.

Referring again to FIG. 5, the updated row and column FPN terms determined in block 550 are stored (block 552) and applied (block 555, e.g., full terms and/or estimates may be applied) to the blurred image frame provided in block 545. After these terms are applied, some of the spatial row and column FPN in the blurred image frame may be reduced. However, because such terms are applied generally to rows and columns, additional FPN may remain such as spatially uncorrelated FPN associated with pixel to pixel drift or other causes. Neighborhoods of spatially correlated FPN may also remain which may not be directly associated with individual rows and columns. Accordingly, further processing may be performed as discussed below to determine NUC terms.

In block 560, local contrast values (e.g., edges or absolute values of gradients between adjacent or small groups of pixels) in the blurred image frame are determined. If scene information in the blurred image frame includes contrasting areas that have not been significantly blurred (e.g., high contrast edges in the original scene data), then such features may be identified by a contrast determination process in block 560.

For example, local contrast values in the blurred image frame may be calculated, or any other desired type of edge detection process may be applied to identify certain pixels in the blurred image as being part of an area of local contrast. Pixels that are marked in this manner may be considered as containing excessive high spatial frequency scene information that would be interpreted as FPN (e.g., such regions may correspond to portions of the scene that have not been sufficiently blurred). As such, these pixels may be excluded from being used in the further determination of NIX terms. In one embodiment, such contrast detection processing may rely on a threshold that is higher than the expected contrast value associated with FPN (e.g., pixels exhibiting a contrast value higher than the threshold may be considered to be scene information, and those lower than the threshold may be considered to be exhibiting FPN).

In one embodiment, the contrast determination of block 560 may be performed on the blurred image frame after row and column FPN terms have been applied to the blurred image frame (e.g., as shown in FIG. 5). In another embodiment, block 560 may be performed prior to block 550 to determine contrast before row and column FPN terms are determined (e.g., to prevent scene based contrast from contributing to the determination of such terms).

Following block 560, it is expected that any high spatial frequency content remaining in the blurred image frame may be generally attributed to spatially uncorrelated FPN. In this regard, following block 560, much of the other noise or actual desired scene based information has been removed or excluded from the blurred image frame due to: intentional blurring of the image frame (e.g., by motion or defocusing in blocks 520 through 545), application of row and column FPN terms (block 555), and contrast determination (block 560).

Thus, it can be expected that following block 560, any remaining high spatial frequency content (e.g., exhibited as areas of contrast or differences in the blurred image frame) may be attributed to spatially uncorrelated FPN. Accordingly, in block 565, the blurred image frame is high pass filtered. In one embodiment, this may include applying a high pass filter to extract the high spatial frequency content from the blurred image frame. In another embodiment, this may include applying a low pass filter to the blurred image frame and taking a difference between the low pass filtered image frame and the unfiltered blurred image frame to obtain the high spatial frequency content. In accordance with various embodiments of the present disclosure, a high pass filter may be implemented by calculating a mean difference between a sensor signal (e.g., a pixel value) and its neighbors.

In block 570, a flat field correction process is performed on the high pass filtered blurred image frame to determine updated NUC terms (e.g., if a NUC process has not previously been performed then the updated NUC terms may be new NUC terms in the first iteration of block 570).

Figure 7:
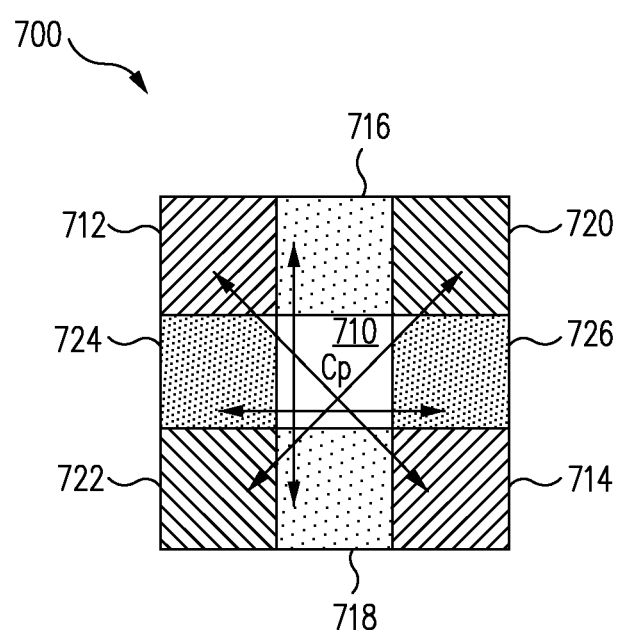
FIG. 7 illustrates a flat field correction technique in accordance with an embodiment of the disclosure.

For example, FIG. 7 illustrates a flat field correction technique 700 in accordance with an embodiment of the disclosure. In FIG. 7, a NUC term may be determined for each pixel 710 of the blurred image frame using the values of its neighboring pixels 712 to 726. For each pixel 710, several gradients may be determined based on the absolute difference between the values of various adjacent pixels. For example, absolute value differences may be determined between: pixels 712 and 714 (a left to right diagonal gradient), pixels 716 and 718 (a top to bottom vertical gradient), pixels 720 and 722 (a right to left diagonal gradient), and pixels 724 and 726 (a left to right horizontal gradient).

These absolute differences may be summed to provide a summed gradient for pixel 710. A weight value may be determined for pixel 710 that is inversely proportional to the summed gradient. This process may be performed for all pixels 710 of the blurred image frame until a weight value is provided for each pixel 710. For areas with low gradients (e.g., areas that are blurry or have low contrast), the weight value will be close to one. Conversely, for areas with high gradients, the weight value will be zero or close to zero. The update to the NUC term as estimated by the high pass filter is multiplied with the weight value.

In one embodiment, the risk of introducing scene information into the NUC terms can be further reduced by applying some amount of temporal damping to the NUC term determination process. For example, a temporal damping factor $\lambda$ between 0 and 1 may be chosen such that the new NUC term ($NUC_{NEW}$) stored is a weighted average of the old NUC term ($NUC_{OLD}$) and the estimated updated NUC term ($NUC_{UPDATE}$). In one embodiment, this can be expressed as $NUC_{NEW} = \lambda \cdot NUC_{OLD} + (1-\lambda) \cdot (NUC_{OLD} + NUC_{UPDATE})$.

Although the determination of NUC terms has been described with regard to gradients, local contrast values may be used instead where appropriate. Other techniques may also be used such as, for example, standard deviation calculations. Other types flat field correction processes may be performed to determine NUC terms including, for example, various processes identified in U.S. Pat. No. 6,028,309 issued Feb. 22, 2000, U.S. Pat. No. 6,812,465 issued Nov. 2, 2004, and U.S. patent application Ser. No. 12/114,865 filed May 5, 2008, which are incorporated herein by reference in their entirety.

Referring again to FIG. 5, block 570 may include additional processing of the NUC terms. For example, in one embodiment, to preserve the scene signal mean, the sum of all NUC terms may be normalized to zero by subtracting the NUC term mean from each NUC term. Also in block 570, to avoid row and column noise from affecting the NUC terms, the mean value of each row and column may be subtracted from the NUC terms for each row and column. As a result, row and column FPN filters using the row and column FPN terms determined in block 550 may be better able to filter out row and column noise in further iterations (e.g., as further shown in FIG. 8) after the NUC terms are applied to captured images (e.g., in block 580 further discussed herein). In this regard, the row and column FPN filters may in general use more data to calculate the per row and per column offset coefficients (e.g., row and column FPN terms) and may thus provide a more robust alternative for reducing spatially correlated FPN than the NUC terms which are based on high pass filtering to capture spatially uncorrelated noise.

In blocks 571-573, additional high pass filtering and further determinations of updated NUC terms may be optionally performed to remove spatially correlated FPN with lower spatial frequency than previously removed by row and column FPN terms. In this regard, some variability in infrared sensors 132 or other components of infrared imaging module 100 may result in spatially correlated FPN noise that cannot be easily modeled as row or column noise. Such spatially correlated FPN may include, for example, window defects on a sensor package or a cluster of infrared sensors 132 that respond differently to irradiance than neighboring infrared sensors 132. In one embodiment, such spatially correlated FPN may be mitigated with an offset correction. If the amount of such spatially correlated FPN is significant, then the noise may also be detectable in the blurred image frame. Since this type of noise may affect a neighborhood of pixels, a high pass filter with a small kernel may not detect the FPN in the neighborhood (e.g., all values used in high pass filter may be taken from the neighborhood of affected pixels and thus may be affected by the same offset error). For example, if the high pass filtering of block 565 is performed with a small kernel (e.g., considering only immediately adjacent pixels that fall within a neighborhood of pixels affected by spatially correlated FPN), then broadly distributed spatially correlated FPN may not be detected.

Figure 11:
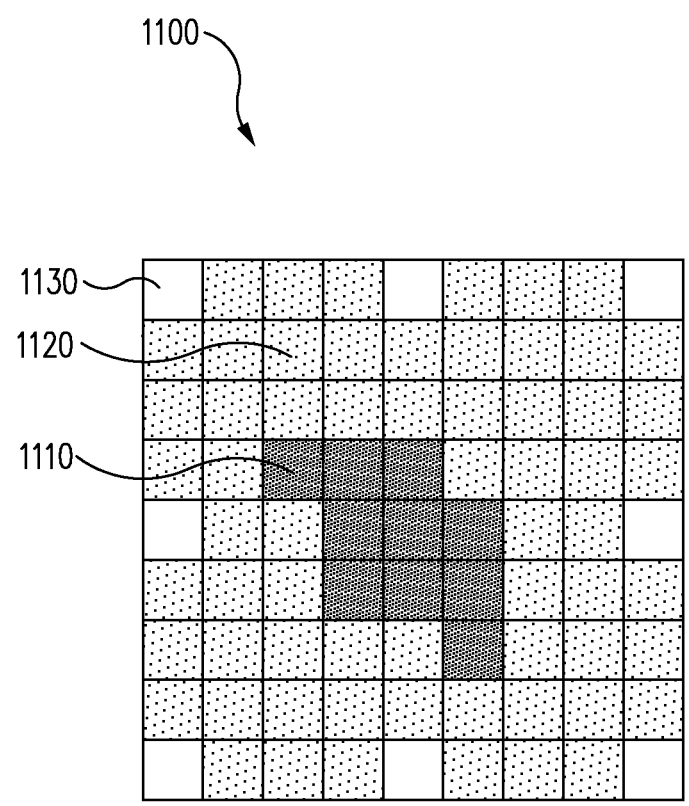
FIG. 11 illustrates spatially correlated FPN in a neighborhood of pixels in accordance with an embodiment of the disclosure.

For example, FIG. 11 illustrates spatially correlated FPN in a neighborhood of pixels in accordance with an embodiment of the disclosure. As shown in a sample image frame 1100, a neighborhood of pixels 1110 may exhibit spatially correlated FPN that is not precisely correlated to individual rows and columns and is distributed over a neighborhood of several pixels (e.g., a neighborhood of approximately 4 by 4 pixels in this example). Sample image frame 1100 also includes a set of pixels 1120 exhibiting substantially uniform response that are not used in filtering calculations, and a set of pixels 1130 that are used to estimate a low pass value for the neighborhood of pixels 1110. In one embodiment, pixels 1130 may be a number of pixels divisible by two in order to facilitate efficient hardware or software calculations.

Referring again to FIG. 5, in blocks 571-573, additional high pass filtering and further determinations of updated NUC terms may be optionally performed to remove spatially correlated FPN such as exhibited by pixels 1110. In block 571, the updated NUC terms determined in block 570 are applied to the blurred image frame. Thus, at this time, the blurred image frame will have been initially corrected for spatially correlated FPN (e.g., by application of the updated row and column FPN terms in block 555), and also initially corrected for spatially uncorrelated FPN (e.g., by application of the updated NUC terms applied in block 571).

In block 572, a further high pass filter is applied with a larger kernel than was used in block 565, and further updated NUC terms may be determined in block 573. For example, to detect the spatially correlated FPN present in pixels 1110, the high pass filter applied in block 572 may include data from a sufficiently large enough neighborhood of pixels such that differences can be determined between unaffected pixels (e.g., pixels 1120) and affected pixels (e.g., pixels 1110). For example, a low pass filter with a large kernel can be used (e.g., an N by N kernel that is much greater than 3 by 3 pixels) and the results may be subtracted to perform appropriate high pass filtering.

In one embodiment, for computational efficiency, a sparse kernel may be used such that only a small number of neighboring pixels inside an N by N neighborhood are used. For any given high pass filter operation using distant neighbors (e.g., a large kernel), there is a risk of modeling actual (potentially blurred) scene information as spatially correlated FPN. Accordingly, in one embodiment, the temporal damping factor may be set close to 1 for updated NUC terms determined in block 573.

In various embodiments, blocks 571-573 may be repeated (e.g., cascaded) to iteratively perform high pass filtering with increasing kernel sizes to provide further updated NUC terms further correct for spatially correlated FPN of desired neighborhood sizes. In one embodiment, the decision to perform such iterations may be determined by whether spatially correlated FPN has actually been removed by the updated NUC terms of the previous performance of blocks 571-573.

After blocks 571-573 are finished, a decision is made regarding whether to apply the updated NUC terms to captured image frames (block 574). For example, if an average of the absolute value of the NUC terms for the entire image frame is less than a minimum threshold value, or greater than a maximum threshold value, the NUC terms may be deemed spurious or unlikely to provide meaningful correction. Alternatively, thresholding criteria may be applied to individual pixels to determine which pixels receive updated NUC terms. In one embodiment, the threshold values may correspond to differences between the newly calculated NUC terms and previously calculated NUC terms. In another embodiment, the threshold values may be independent of previously calculated NUC terms. Other tests may be applied (e.g., spatial correlation tests) to determine whether the NUC terms should be applied.

If the NUC terms are deemed spurious or unlikely to provide meaningful correction, then the flow diagram returns to block 505. Otherwise, the newly determined NUC terms are stored (block 575) to replace previous NUC terms (e.g., determined by a previously performed iteration of FIG. 5) and applied (block 580) to captured image frames.

Figure 8:
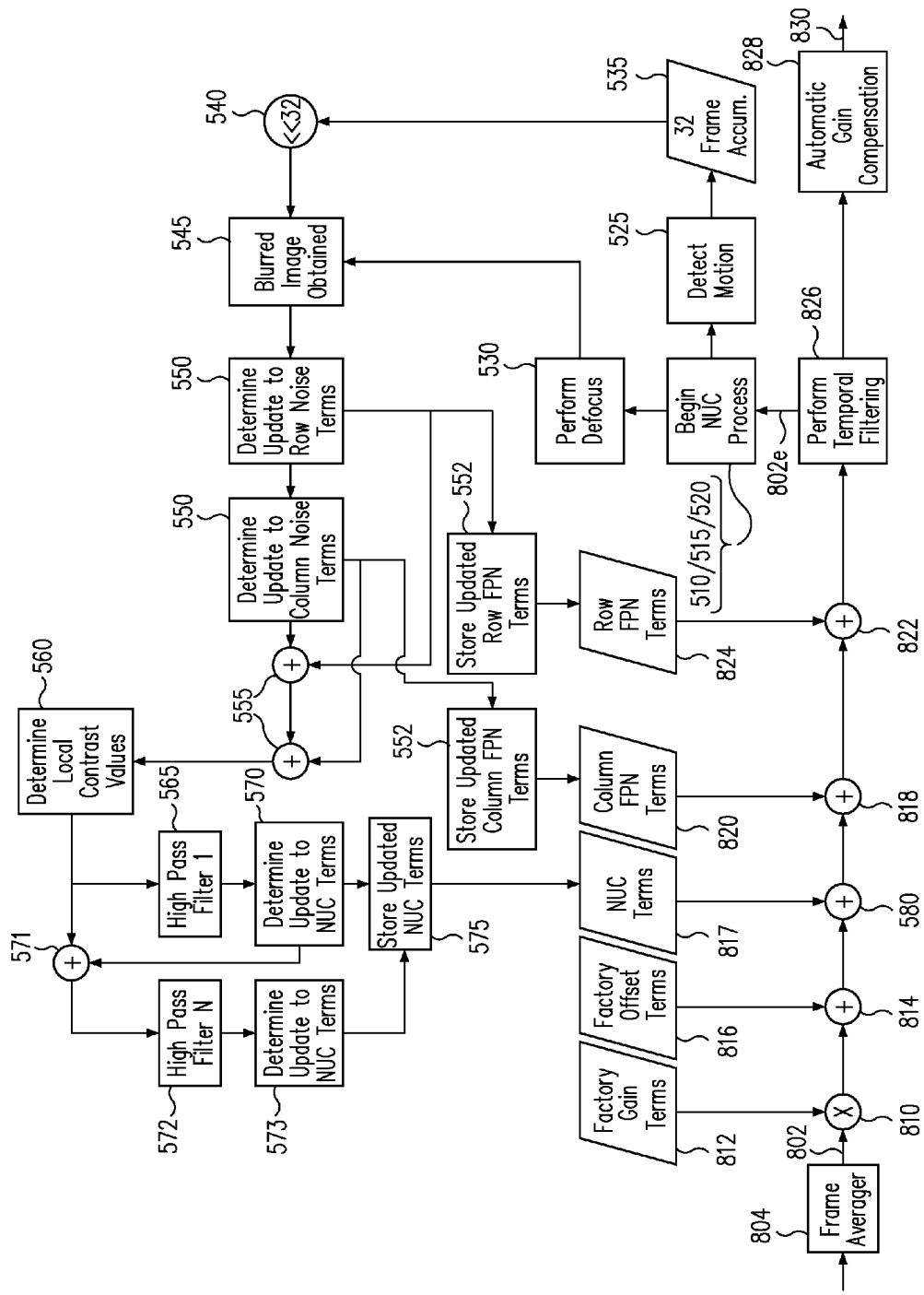
FIG. 8 illustrates various image processing techniques of FIG. 5 and other operations applied in an image processing pipeline in accordance with an embodiment of the disclosure.

FIG. 8 illustrates various image processing techniques of FIG. 5 and other operations applied in an image processing pipeline 800 in accordance with an embodiment of the disclosure. In this regard, pipeline 800 identifies various operations of FIG. 5 in the context of an overall iterative image processing scheme for correcting image frames provided by infrared imaging module 100. In some embodiments, pipeline 800 may be provided by processing module 160 or processor 195 (both also generally referred to as a processor) operating on image frames captured by infrared sensors 132.

Image frames captured by infrared sensors 132 may be provided to a frame averager 804 that integrates multiple image frames to provide image frames 802 with an improved signal to noise ratio. Frame averager 804 may be effectively provided by infrared sensors 132, ROIC 402, and other components of infrared sensor assembly 128 that are implemented to support high image capture rates. For example, in one embodiment, infrared sensor assembly 128 may capture infrared image frames at a frame rate of 240 Hz (e.g., 240 images per second). In this embodiment, such a high frame rate may be implemented, for example, by operating infrared sensor assembly 128 at relatively low voltages (e.g., compatible with mobile telephone voltages) and by using a relatively small array of infrared sensors 132 (e.g., an array of 64 by 64 infrared sensors in one embodiment).

In one embodiment, such infrared image frames may be provided from infrared sensor assembly 128 to processing module 160 at a high frame rate (e.g., 240 Hz or other frame rates). In another embodiment, infrared sensor assembly 128 may integrate over longer time periods, or multiple time periods, to provide integrated (e.g., averaged) infrared image frames to processing module 160 at a lower frame rate (e.g., 30 Hz, 9 Hz, or other frame rates). Further information regarding implementations that may be used to provide high image capture rates may be found in U.S. Provisional Patent Application No. 61/495,879 previously referenced herein.

Image frames 802 proceed through pipeline 800 where they are adjusted by various terms, temporally filtered, and additionally processed. In blocks 810 and 814, factory gain terms 812 (e.g., gain offsets/coefficients in one embodiment) and factory offset terms 816 (e.g., pixel offsets/coefficients and LaGrange offsets/coefficients in one embodiment) are applied to image frames 802 to compensate for gain and offset differences, respectively, between the various infrared sensors 132 and/or other components of infrared imaging module 100 determined during manufacturing and testing.

In block 580, NUC terms 817 are applied to image frames 802 to correct for FPN as discussed. In one embodiment, if NUC terms 817 have not yet been determined (e.g., before a NUC process has been initiated), then block 580 may not be performed or initialization values may be used for NUC terms 817 that result in no alteration to the image data (e.g., offsets for every pixel would be equal to zero).

In blocks 818 and 822, column FPN terms 820 and row FPN terms 824, respectively, are applied to image frames 802. Column FPN terms 820 and row FPN terms 824 may be determined in accordance with block 550 as discussed. In one embodiment, if the column FPN terms 820 and row FPN teams 824 have not yet been determined (e.g., before a NUC process has been initiated), then blocks 818 and 822 may not be performed or initialization values may be used for the column FPN terms 820 and row FPN terms 824 that result in no alteration to the image data (e.g., offsets for every pixel would be equal to zero).

Figure 9:
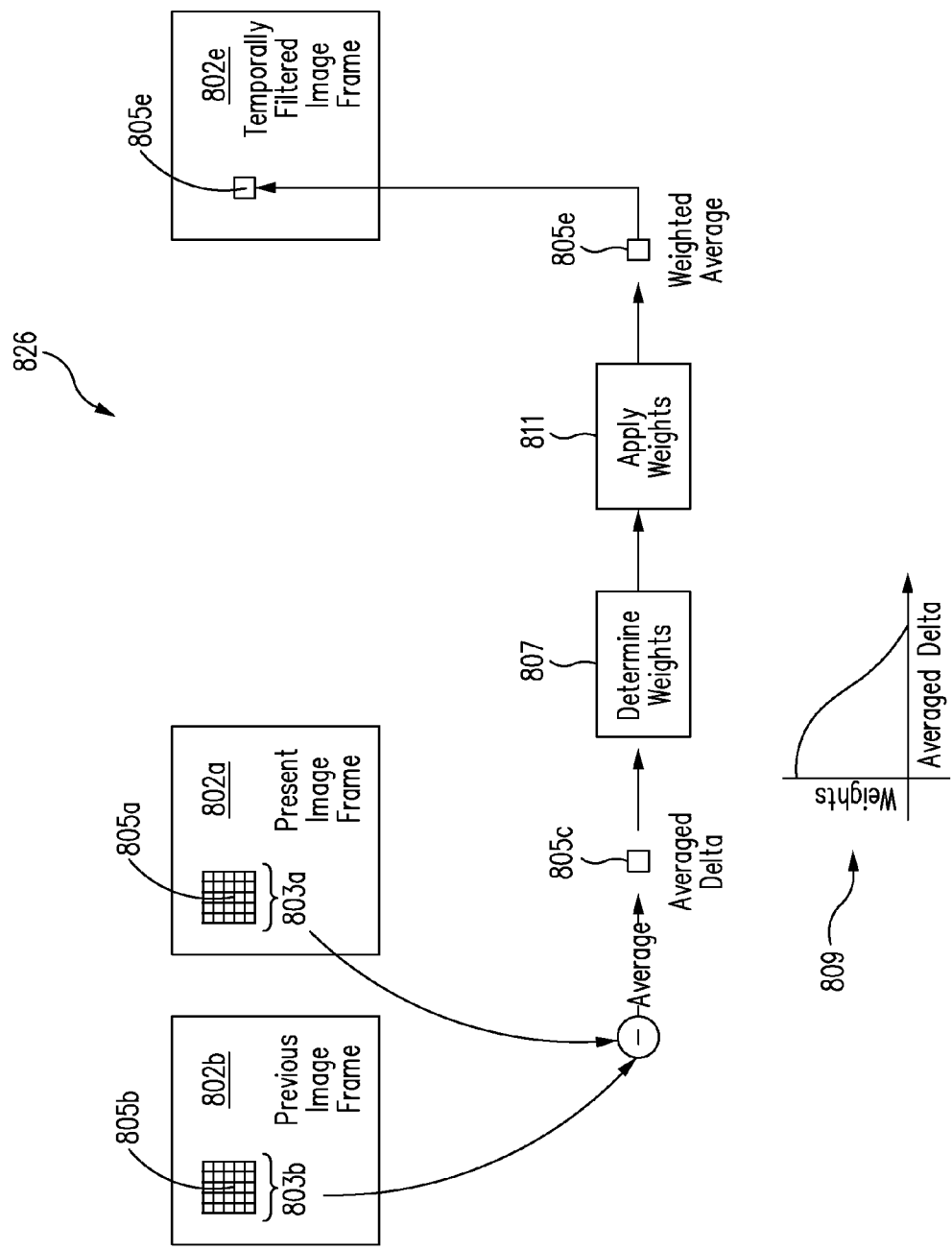
FIG. 9 illustrates a temporal noise reduction process in accordance with an embodiment of the disclosure.

In block 826, temporal filtering is performed on image frames 802 in accordance with a temporal noise reduction (TNR) process. FIG. 9 illustrates a TNR process in accordance with an embodiment of the disclosure. In FIG. 9, a presently received image frame 802a and a previously temporally filtered image frame 802b are processed to determine a new temporally filtered image frame 802e. Image frames 802a and 802b include local neighborhoods of pixels 803a and 803b centered around pixels 805a and 805b, respectively. Neighborhoods 803a and 803b correspond to the same locations within image frames 802a and 802b and are subsets of the total pixels in image frames 802a and 802b. In the illustrated embodiment, neighborhoods 803a and 803b include areas of 5 by 5 pixels. Other neighborhood sizes may be used in other embodiments.

Differences between corresponding pixels of neighborhoods 803a and 803b are determined and averaged to provide an averaged delta value 805c for the location corresponding to pixels 805a and 805b. Averaged delta value 805c may be used to determine weight values in block 807 to be applied to pixels 805a and 805b of image frames 802a and 802b.

In one embodiment, as shown in graph 809, the weight values determined in block 807 may be inversely proportional to averaged delta value 805c such that weight values drop rapidly towards zero when there are large differences between neighborhoods 803a and 803b. In this regard, large differences between neighborhoods 803a and 803b may indicate that changes have occurred within the scene (e.g., due to motion) and pixels 802a and 802h may be appropriately weighted, in one embodiment, to avoid introducing blur across frame-to-frame scene changes. Other associations between weight values and averaged delta value 805c may be used in various embodiments.

The weight values determined in block 807 may be applied to pixels 805a and 805b to determine a value for corresponding pixel 805e of image frame 802e (block 811). In this regard, pixel 805e may have a value that is a weighted average (or other combination) of pixels 805a and 805b, depending on averaged delta value 805c and the weight values determined in block 807.

For example, pixel 805e of temporally filtered image frame 802e may be a weighted sum of pixels 805a and 805b of image frames 802a and 802b. If the average difference between pixels 805a and 805b is due to noise, then it may be expected that the average change between neighborhoods 805a and 805b will be close to zero (e.g., corresponding to the average of uncorrelated changes). Under such circumstances, it may be expected that the sum of the differences between neighborhoods 805a and 805b will be close to zero. In this case, pixel 805a of image frame 802a may both be appropriately weighted so as to contribute to the value of pixel 805e.

However, if the sum of such differences is not zero (e.g., even differing from zero by a small amount in one embodiment), then the changes may be interpreted as being attributed to motion instead of noise. Thus, motion may be detected based on the average change exhibited by neighborhoods 805a and 805b. Under these circumstances, pixel 805a of image frame 802a may be weighted heavily, while pixel 805b of image frame 802b may be weighted lightly.

Other embodiments are also contemplated. For example, although averaged delta value 805c has been described as being determined based on neighborhoods 805a and 805b, in other embodiments averaged delta value 805c may be determined based on any desired criteria (e.g., based on individual pixels or other types of groups of sets of pixels).

In the above embodiments, image frame 802a has been described as a presently received image frame and image frame 802b has been described as a previously temporally filtered image frame. In another embodiment, image frames 802a and 802b may be first and second image frames captured by infrared imaging module 100 that have not been temporally filtered.

Figure 10:
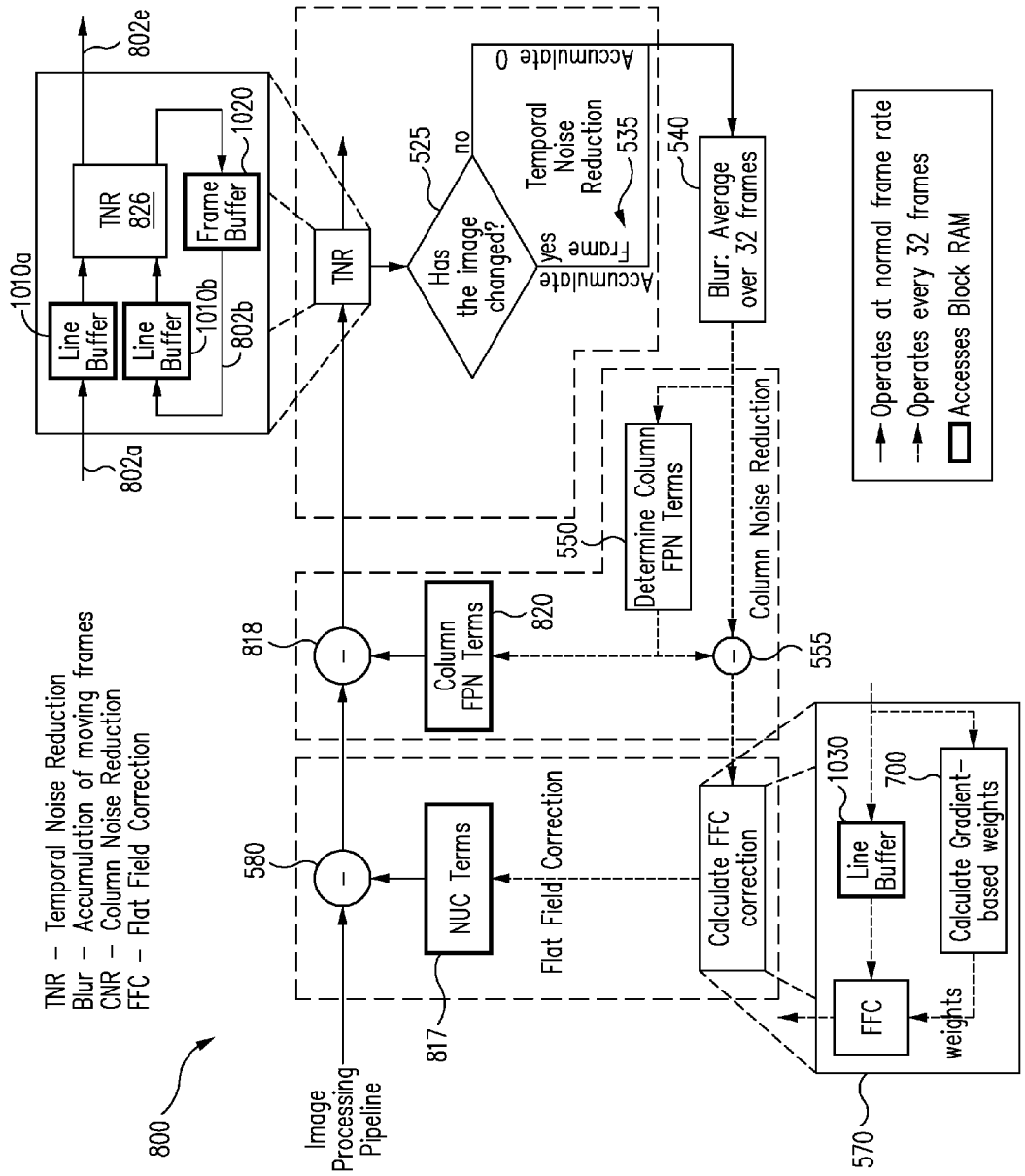
FIG. 10 illustrates particular implementation details of several processes of the image processing pipeline of FIG. 6 in accordance with an embodiment of the disclosure.

FIG. 10 illustrates further implementation details in relation to the TNR process of block 826. As shown in FIG. 10, image frames 802a and 802b may be read into line buffers 1010a and 1010b, respectively, and image frame 802b (e.g., the previous image frame) may be stored in a frame buffer 1020 before being read into line buffer 1010b. In one embodiment, line buffers 1010a-b and frame buffer 1020 may be implemented by a block of random access memory (RAM) provided by any appropriate component of infrared imaging module 100 and/or host device 102.

Referring again to FIG. 8, image frame 802e may be passed to additional blocks 827-832 for further processing to provide a result image frame 833 that may be used by host device 102 as desired. In one embodiment, such processing may include: bad pixel replacement processing in block 827 (e.g., to compensate for malfunctioning or inoperative pixels); distortion correction processing in block 828 (e.g., to compensate for possible lens distortion or other distortion); video polarity processing in block 829; gamma correction processing in block 830; automatic gain compensation processing in block 831; and pseudo-color processing in block 832 (e.g., using a look up table (LUT)).

FIG. 8 further illustrates various operations that may be performed to determine row and column FPN terms and NUC terms as discussed. In one embodiment, these operations may use image frames 802e as shown in FIG. 8. Because image frames 802e have already been temporally filtered, at least some temporal noise may be removed and thus will not inadvertently affect the determination of row and column FPN terms 824 and 820 and NUC terms 817. In another embodiment, non-temporally filtered image frames 802 may be used.

In FIG. 8, blocks 510, 515, and 520 of FIG. 5 are collectively represented together. As discussed, a NUC process may be selectively initiated and performed in response to various NUC process initiating events and based on various criteria or conditions. As also discussed, the NUC process may be performed in accordance with a motion-based approach (blocks 525, 535, and 540) or a defocus-based approach (block 530) to provide a blurred image frame (block 545). FIG. 8 further illustrates various additional blocks 550, 552, 555, 560, 565, 570, 571, 572, 573, and 575 previously discussed with regard to FIG. 5.

As shown in FIG. 8, row and column FPN terms 824 and 820 and NUC terms 817 may be determined and applied in an iterative fashion such that updated terms are determined using image frames 802 to which previous terms have already been applied. As a result, the overall process of FIG. 8 may repeatedly update and apply such terms to continuously reduce the noise in image frames 833 to be used by host device 102.

Referring again to FIG. 10, further implementation details are illustrated for various blocks of FIGS. 5 and 8 in relation to pipeline 800. For example, blocks 525, 535, and 540 are shown as operating at the normal frame rate of image frames 802 received by pipeline 800. In the embodiment shown in FIG. 10, the determination made in block 525 is represented as a decision diamond used to determine whether a given image frame 802 has sufficiently changed such that it may be considered an image frame that will enhance the blur if added to other image frames and is therefore accumulated (block 535 is represented by an arrow in this embodiment) and averaged (block 540).

Also in FIG. 10, the determination of column FPN terms 820 (block 550) is shown as operating at an update rate that in this example is ⅟32 of the sensor frame rate (e.g., normal frame rate) due to the averaging performed in block 540. Other update rates may be used in other embodiments. Although only column FPN terms 820 are identified in FIG. 10, row FPN terms 824 may be implemented in a similar fashion at the reduced frame rate.

FIG. 10 also illustrates further implementation details in relation to the NUC determination process of block 570. In this regard, the blurred image frame may be read to a line buffer 1030 (e.g., implemented by a block of RAM provided by any appropriate component of infrared imaging module 100 and/or host device 102). The flat field correction technique 700 of FIG. 7 may be performed on the blurred image frame.

In view of the present disclosure, it will be appreciated that techniques described herein may be used to remove various types of FPN (e.g., including very high amplitude FPN) such as spatially correlated row and column FPN and spatially uncorrelated FPN.

Other embodiments are also contemplated. For example, in one embodiment, the rate at which row and column FPN terms and/or NUC terms are updated can be inversely proportional to the estimated amount of blur in the blurred image frame and/or inversely proportional to the magnitude of local contrast values (e.g., determined in block 560).

In various embodiments, the described techniques may provide advantages over conventional shutter-based noise correction techniques. For example, by using a shutterless process, a shutter (e.g., such as shutter 105) need not be provided, thus permitting reductions in size, weight, cost, and mechanical complexity. Power and maximum voltage supplied to, or generated by, infrared imaging module 100 may also be reduced if a shutter does not need to be mechanically operated. Reliability will be improved by removing the shutter as a potential point of failure. A shutterless process also eliminates potential image interruption caused by the temporary blockage of the imaged scene by a shutter.

Also, by correcting for noise using intentionally blurred image frames captured from a real world scene (not a uniform scene provided by a shutter), noise correction may be performed on image frames that have irradiance levels similar to those of the actual scene desired to be imaged. This can improve the accuracy and effectiveness of noise correction terms determined in accordance with the various described techniques.

In accordance with additional embodiments, various techniques are provided to implement line based processing of thermal images. In one embodiment, individual lines of a thermal image frame may be provided to an image processing pipeline provided, for example, by one or more processing devices of infrared imaging module 100. Image processing operations may be performed on the individual lines in stages of the image processing pipeline.

In accordance with additional embodiments, techniques are provided to implement a flexible memory system to support one or more processing devices of infrared imaging module 100. For example, in some embodiments, the memory system may be used to support line based (e.g., row based or column based) processing of thermal images provided by infrared sensor assembly 128. In this regard, a line may generally refer to a row or a column, and the terms line, row, and column are used interchangeably herein.

Also in some embodiments, the memory system may be used to send and receive data between various components without relying on a single shared bus between the components. For example, in some embodiments, data transfers may be performed between different components and different memories of the memory system using a switch fabric to route data over different buses simultaneously or substantially simultaneously. In some embodiments, the memory system may be implemented to support data transfers using different clocks of the various components, without requiring the components and the memory system to all be synchronized to the same clock source.

These and other features of various embodiments of the memory system are further described with regard to FIGS. 12-16E. Although the memory system will be primarily described with regard to processing module 160, it may be used with any processing device (e.g., processing module 160, processor 195, and/or other devices) and the various components of processing module 160 may be implemented as any type of processing device, logic, and/or circuitry as appropriate in various implementations.

Figure 12:
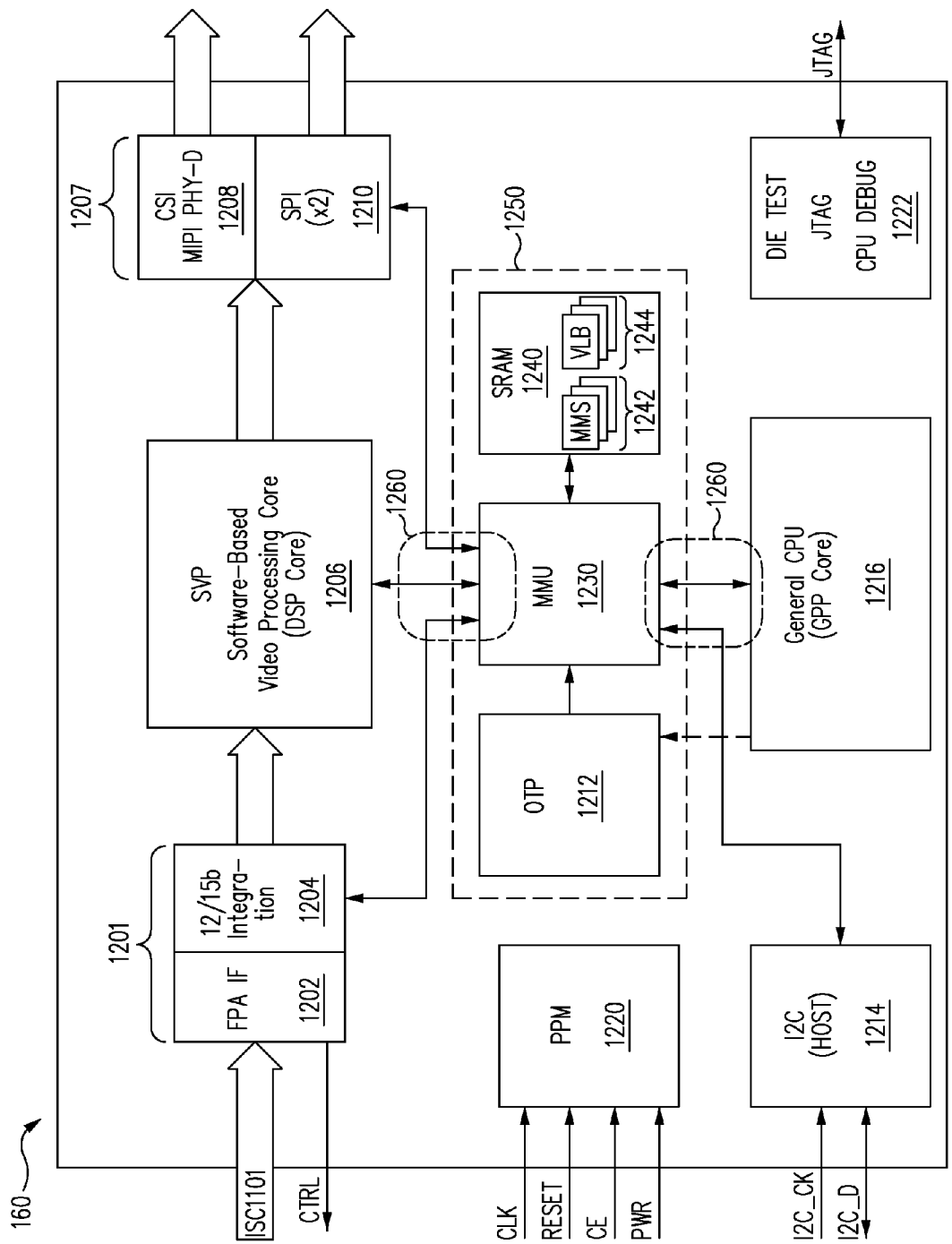
FIG. 12 illustrates a block diagram of a processing module in accordance with an embodiment of the disclosure.

FIG. 12 illustrates a block diagram of processing module 160 in accordance with an embodiment of the disclosure. In the illustrated embodiment, processing module includes a sensor input block 1201, a digital signal processing (DSP) core 1206, a video output block 1207, a one time programmable (OTP) memory 1212, an inter-integrated circuit (I2C) interface 1214, a general purpose CPU 1216, a system control block 1220, a system support block 1222, a memory management unit (MMU) 1230, and memory blocks 1240.

Sensor input block 1201 receives thermal image frames from infrared sensor assembly 128 which correspond to thermal images captured by infrared sensors 132. In this regard, sensor input block 1201 includes an FPA interface 1202 to receive the thermal image frames and an integration block 1204 to integrate the thermal image frames (e.g., provided in form of analog or digital signals) over multiple thermal image frames to provide, for example, thermal image frames with improved signal to noise characteristics.

DSP core 1206 may be used to perform any of the various operations described herein to process thermal image data and/or related operations. For example, in some embodiments, DSP core 1206 may be used to implement pipeline 800 of FIG. 8. DSP core 1206 may be implemented as any appropriate processing device.

Video output block 1207 provides processed thermal image frames from processing module to other components of infrared imaging module 100, host device 102, and/or other devices through one or more mobile industry processor interfaces (MIPI) 1208 and/or one or more serial peripheral interfaces (SPI) 1210.

OTP memory 1212 (e.g., including one or more OTP memory blocks) may be implemented with appropriate control circuitry and non-volatile memory used to store various previously determined data for use in the various operations described herein. Such data may include, but need not be limited to, factory gain terms 812 and factory offset terms 816 (e.g., collectively and separately referred to as factory calibration terms), bad pixel maps/lists, pixel deltas and weights for distortion correction, look up tables (LUT) for color, polarity, and gamma corrections, and/or other data as appropriate. Although OTP memory 1212 is generally referred to herein, any type of volatile or non-volatile memory may be used in addition to and/or instead of OTP memory 1212 as may be appropriate in various implementations.

I2C interface 1214 may be used to support communications between processing module 160 and host device 102. General purpose CPU 1216 (e.g., also referred to as a GPP core) may be used to perform various operations to support the overall operation of processing module 160 including, for example, servicing communications and commands over I2C interface 1214, initializing data and DSP core 1206, power management, write sequencing for OTP memory block 1212, direct memory access (DMA) operations, memory mapping and configuration, configuration of DSP core 1206, configuration of video output block 1207, calibration support, and/or other operations. GPP core 1216 may be implemented as any appropriate processing device.

System control block 1220 (e.g., also referred to as a PPM block) may be used to generate clocks and reset signals, and provide on-chip power control. System support block 1222 may be used to perform various die test and CPU debugging operations, and provide one or more joint test action group (JTAG) interfaces (e.g., IEEE 1149.1 standard test access port and boundary-scan architecture).

Memory management unit (MMU) 1230 (e.g., a memory controller) may be used to manage data communications between OTP memory 1212, memory blocks 1240, and other components of processing module 160. For example, in some embodiments, MMU 1230 may pass data over various buses 1260 connected to MMU 1230 as illustrated in FIG. 12. Thus, OTP memory 1212, MMU 1230, and memory blocks 1240 may effectively provide a memory system 1250 to support line based processing of thermal images and various operations described herein. In this regard, memory system 1250 may provide a switch fabric to selectively route data between components of processing module 160 and the various memories of memory system 1250. Such a switch fabric may be provided, for example, by MMU 1230 and/or additional circuitry of OTP memory 1212 and/or memory blocks 1240.

Memory blocks 1240 may be implemented, for example, as volatile static random access memory (SRAM) including main memory slices (MMSs) 1242 and virtual line buffers (VLBs) 1244 further described herein. In one embodiment, memory blocks 1240 may include 3 Mbits of SRAM, with approximately 2.5 Mbits allocated to MMSs 1242 (e.g., each MMS 1242 may include approximately 256 kbits of SRAM) and approximately 0.5 Mbits allocated to all of VLBs 1244 (e.g., each of 64 VLBs 1244 may include approximately 8 kbits of SRAM). Other implementations and configurations of volatile and/or non-volatile memory are also contemplated.

Figure 13:
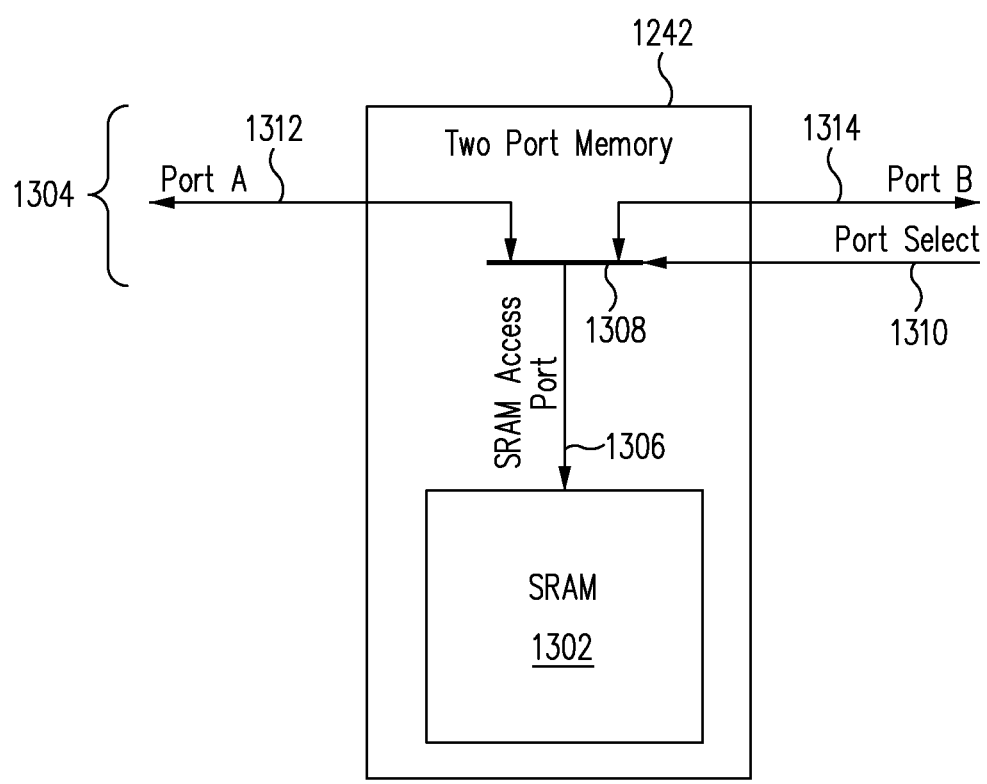
FIG. 13 illustrates a block diagram of a main memory slice (MMS) in accordance with an embodiment of the disclosure.

FIG. 13 illustrates a block diagram of an MMS 1242 of memory system 1250 in accordance with an embodiment of the disclosure. MMS 1242 includes a memory block 1302 and access circuitry 1304 providing a switch fabric for MMS 1242. In one embodiment, memory block 1302 may be implemented as a 256 kbit SRAM memory block having a single interface 1306 (e.g., also referred to as an SRAM access port) adapted to support a single read or write operation at a time. Access circuitry 1304 may be used to permit one or more components of processing module 160 to access memory block 1302 through multiple ports 1312 and 1314 (e.g., memory bus ports). Components of processing module 160 may also be referred to as owners of MMS 1242 when MMS 1242 is configured for access by such components. Access circuitry 1304 includes a multiplexer 1308, a port select input 1310, and ports 1312 and 1314 (e.g., each port providing read and write access in one embodiment). In some embodiments, access circuitry 1304 may be implemented with additional circuitry and/or logic as appropriate.

In one embodiment, MMU 1230 and access circuitry 1304 may be used to permit simultaneous or substantially simultaneous access to memory block 1302 by multiple components of processing module 160. In this regard, MMU 1230 may be connected to port select input 1310 and ports 1312 and 1314 to manage access to memory block 1302 by other components of processing module 160. For example, MMU 1230 may pass data between any of the various components of processing module 160 and memory block 1302 through ports 1312 and 1314.

Figure 14:
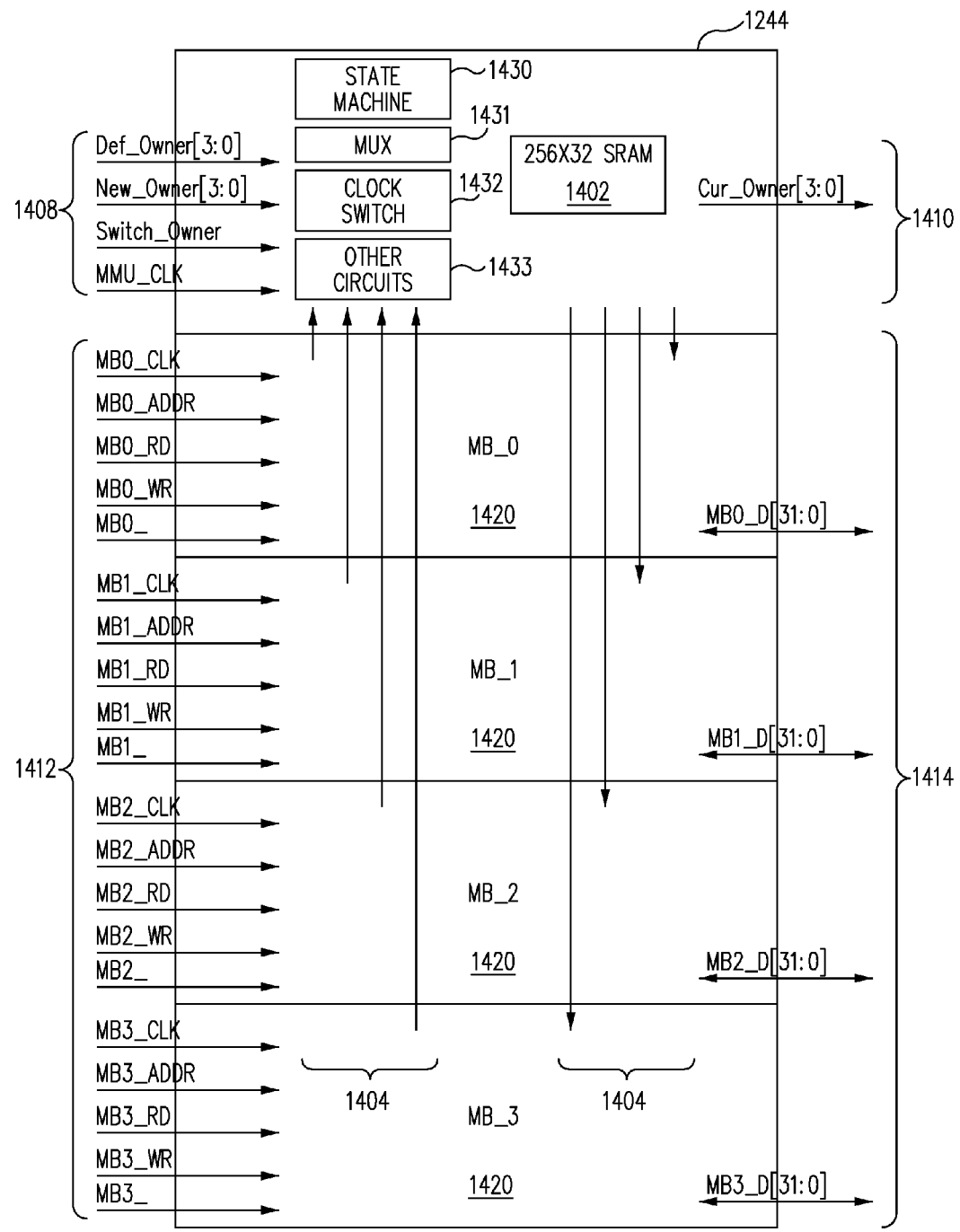
FIG. 14 illustrates a block diagram of a virtual line buffer (VLB) in accordance with an embodiment of the disclosure.

FIG. 14 illustrates a block diagram of a VLB 1244 of memory system 1250 in accordance with an embodiment of the disclosure. VLB 1244 includes a memory block 1402 and a switch fabric 1404. In one embodiment, memory block 1402 may be implemented as an 8 kbit SRAM memory block having a single interface 1403 (e.g., also referred to as an SRAM access port and shown in FIG. 15 as interfaces 1403A-D for memory blocks 1402A-D of memory buffers 1244A-D) adapted to support a single read or write operation at a time. Switch fabric 1404 may be used to permit one or more components of processing module 160 to access memory block 1402 through multiple ports 1420 (e.g., memory bus ports labeled MB_0 through MB_3). Although four ports 1420 are shown in FIG. 14, any desired number of ports 1420 may be provided. Similar to MMS 1242, components of processing module 160 may also be referred to as owners of VLB 1244 when VLB 1244 is configured for access by such components.

In FIG. 14, switch fabric 1404 is represented by arrows and may also include one or more multiplexers 1431 used to select between ports 1420. VLB 1244 may also include one or more state machines 1430, clock switches 1432, and/or other circuits 1433, any of which may be provided as part of, or separate from, switch fabric 1404. VLB 1244 receives control signals 1408, for example, from MMU 1230 which cause VLB 1244 to be configured to permit various components of processing module 160 to access memory block 1402. In one embodiment, a state machine 1430 may operate multiplexers 1431 in response to control signals 1408 to selectively couple memory block 1402 with one or more ports 1420. In this regard, in one embodiment, control signals 1408 may be used to: define the owner of VLB 1244 (signal Def_Owner); identify the next owner of VLB 1244 (signal New_Owner); switch to the next owner through a signal transition (signal Switch_Owner); and provide a clock for state machine 1430 (signal MMU_CLK). VLB 1244 also provides control signal 1410 (signal Cur_Owner) to identify the current owner of VLB 1244.

Each port 1420 may receive corresponding input signals 1412 from a particular component of processing module 160 in communication with VLB 1244 through buses 1260 and/or MMU 1230. In one embodiment, input signals 1412 may include: a clock signal (signal MBx_CLK); an address signal (signal MBx_ADDR); a read signal (signal MBx_RD); a write signal (signal MBx_WR); and one or more additional signals (signal MBx_).

Memory block 1402 may be synchronized by the particular clock signal MBx_CLK of the particular port 1420 to which memory block 1402 is currently connected. For example, while memory block 1402 is associated with port MB_0, memory block 1402 may be synchronized by clock signal MB0_CLK. If memory block is subsequently associated with port MB_1 (e.g., based on control signals 1408), then memory block 1402 may be synchronized by clock signal MB1_CLK. In this regard, one or more clock switches 1432 may be used to permit such changes in clock synchronization. For example, one or more clock switches 1432 may be used to provide glitchless transitions between different clock signals provided to memory block 1402. Accordingly, ownership of memory block 1402 may be rapidly switched between various components of processing module 160 running independent clocks and without requiring clock resampling or resynchronization across different clock domains (e.g., which could otherwise result in extra indeterminate latency clock cycles lost for each clock domain crossing). In one embodiment, if no clock signal is available for a selected port 1420, then memory block 1402 may be synchronized by clock signal MMU_CLK of control signals 1408.

Each port 1420 may exchange data signals 1414 (signals MBx_D) with its associated component of processing module 160 through buses 1260 and/or MMU 1230. In some embodiments, data signals 1414 of different ports 1420 may be used simultaneously. For example, in one embodiment, data may be passed from memory block 1402 to several components of processing module 160.

Figure 15:
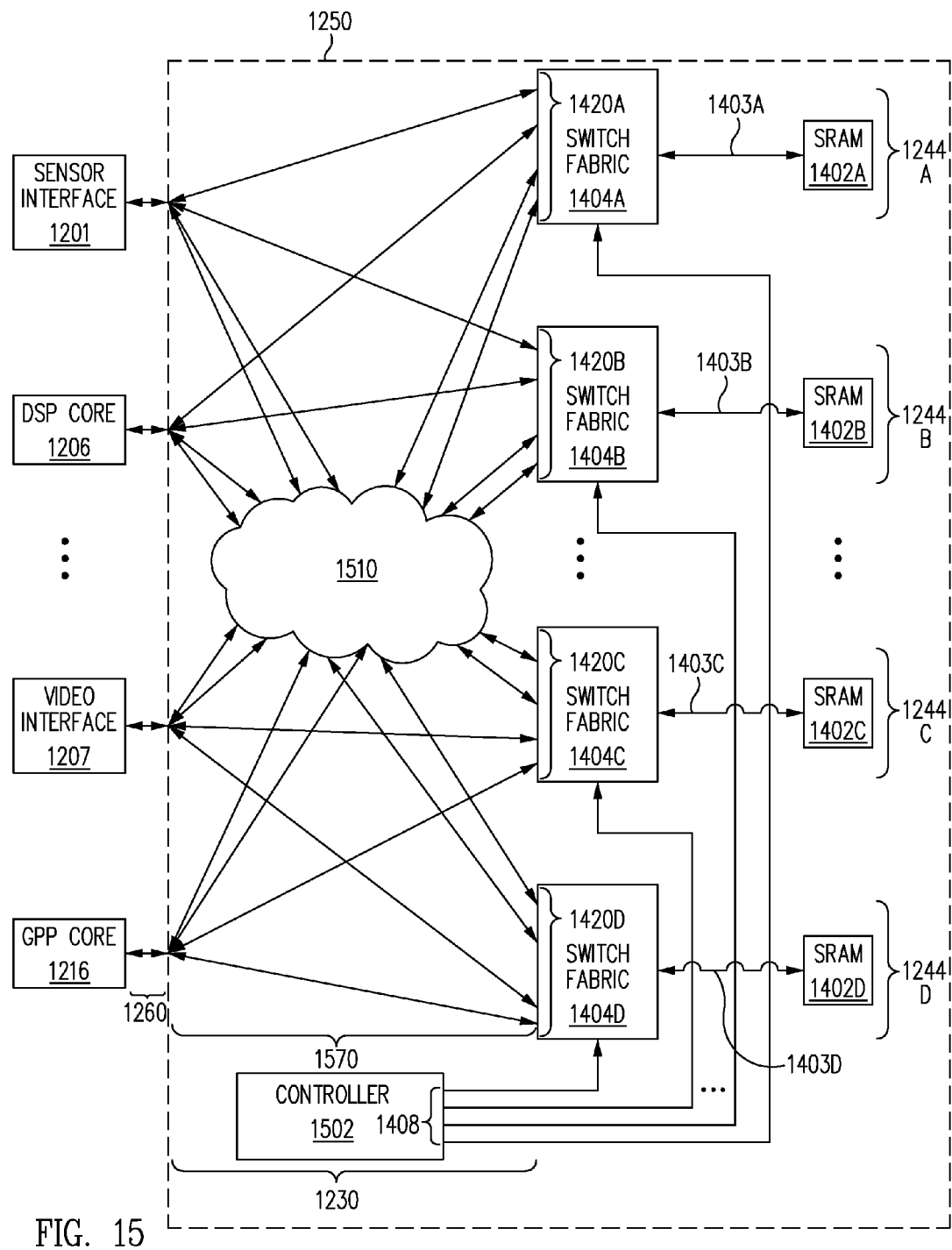
FIG. 15 illustrates a block diagram of a portion of a memory system in communication with various components in accordance with an embodiment of the disclosure.

FIG. 15 illustrates a block diagram of a portion of memory system 1250 in communication with various components of processing module 160 in accordance with an embodiment of the disclosure. As shown, memory system 1250 is in communication with sensor interface 1201, DSP core 1206, video interface 1207, and GPP core 1216 over buses 1260. However, such communication may be provided with fewer or greater numbers of components of processing module 160 or other devices in other embodiments.

MMU 1230 manages the passing of input signals 1412 and data signals 1414 between buses 1260 and VLBs 1244 (e.g. labeled 1244A-D in FIG. 15) through one or more communication channels 1510 (e.g., hardware circuit paths, multiplexed communications, and/or other forms as appropriate), some of which are shown with specific paths and others are shown more generally as a cloud in FIG. 15. In this regard, MMU 1230 may be implemented, for example, with a memory controller 1502 and/or other circuitry as appropriate to generate control signals 1408 and to control communication channels 1510.

For example, in some embodiments, memory controller 1502 may be configured with a predetermined instruction sequence (e.g., provided on a non-transitory machine readable medium) that is optimized for pipeline 800 and/or the operations shown in FIGS. 16A-E. In this regard, memory controller 1502 may generate control signals 1408 to independently operate each of switch fabric blocks 1404A-D to support data transfers between various components for thermal image processing and/or other operations.

As discussed, each VLB 1244 may be implemented with a memory block 1402 (e.g., labeled 1402A-D in FIG. 15) and a switch fabric 1404 (e.g., labeled 1404A-D in FIG. 15). Control signals 1408 provided by MMU 1230 may be used to control the switch fabric 1404 of each VLB 1244 to selectively pass input signals 1412 and data signals 1414 through particular ports 1420 (e.g., labeled 1420A-D for VLBs 1244A-D).

In the embodiment shown in FIG. 15, a corresponding communication channel 1510 is provided between each of sensor interface 1201, DSP core 1206, video interface 1207, and GPP core 1216 and one of the ports 1420 of each VLB 1244. As a result, such components may share and pass data (e.g., any desired type of information, messages, and/or other content) between each other using memory system 1250. For example, in one embodiment, sensor interface 1201 may be an owner of SRAM 1402A of VLB 1244A and may access SRAM 1402A through the first port of VLB 1244A. It may be desired to share the data in SRAM 1402A with DSP core 1206 (e.g., for further processing). In this case, memory controller 1502 of MMU 1230 may generate control signals 1408 to operate switch fabric 1404A to select the second port of VLB 1244A. As a result, DSP core 1206 may now be the owner of SRAM 1402A and thus access SRAM 1402A to read or write data therewith.

In another embodiment, MMU 1230 and/or switch fabric 1404 may be configured to permit multiple components to receive data signals 1414 over multiple communication channels 1510 from a single SRAM 1402. Accordingly, such an embodiment provides another flexible approach for sharing data of SRAMs 1402.

In another embodiment, different components of processor module 160 may be connected to different combinations of VLBs 1244 (e.g., different subsets of VLBs 1244). For example, a first one of VLBs 1244 may be configured to communicate with a first subset of components over a first set of buses 1260, and a second one of VLBs 1244 may be configured to communicate with a second subset of components over a second set of buses 1260. In some embodiments, the first and second subsets of components and buses 1260 may be the same as each other. In other embodiments, the first and second subsets of components and buses 1260 may be different from each other (e.g., the subsets may have some or none of the same components and buses 1260 in common with each other).

Data may be passed between one or more intermediate components and/or SRAMS 1402. For example, if communication channels 1510 are provided: between sensor interface 1201 and only VLBs 1244A-B; between DSP core 1206 and only VLBs 1244B-C; between video interface 1207 and only VLBs 1244C-D; and between GPP core 1216 and only VLB 1244D, then intermediate data passing may be performed to share data from SRAM 1402A with GPP core 1216. In this case, data in SRAM 1402A could be provided to GPP core 1216, for example, by: sensor interface 1201 reading data from SRAM 1402A and writing the data into SRAM 1402B, DSP core 1206 reading the data from SRAM 1402B and writing the data into SRAM 1402C, and video interface 1207 reading the data from SRAM 1402C and writing the data into SRAM 1402D, and GPP core 1216 reading the data from SRAM 1402D. Other data sharing combinations are also contemplated.

FIGS. 16A-E illustrate various operations performed by memory system 1250 and DSP core 1206 in accordance with embodiments of the disclosure. For example, in some embodiments, at least some of the operations of FIGS. 16A-E may correspond to operations of pipeline 800 of FIG. 8.

In some embodiments, the operations of FIGS. 16A-E may be performed in a line based manner. In this regard, individual lines (e.g., rows or columns) of an image frame may be passed through different pipeline stages illustrated in FIGS. 16A-E. Such an approach permits individual VLBs 1244 to be efficiently used to store data associated with a particular line of a thermal image frame. Thus, the processing of different lines of a thermal image frame may be distributed among different VLBs 1244 and different pipeline stages during the operations of FIGS. 16A-E. Such data may also be shared by various components of processing module 160 as described. Although line based processing is described primarily with regard to FIGS. 16A-E, such line based processing may be similarly implemented in any of the operations of the present disclosure as desired.

FIGS. 16A-E identify various types of data passed between portions of memory system 1250 and DSP core 1206. In general, the various types of data identified in FIGS. 16A-E, and similar data, may be referred to as thermal image data (e.g., data that includes at least a portion of a captured thermal image, data used in the processing of thermal images, and/or any data associated with such processing).

In one embodiment, various data identified as "OTP" may be stored by OTP memory 1212. In one embodiment, data that is less than approximately 8 kbits may be stored by VLBs 1244. Such data may be referred to as rows, row buffers, line history, LUTs, and/or other terms. Such data may be of various sizes as set forth in FIGS. 16A-E or other sizes (e.g., 60×1×8 bits, 80×1×8 bits, 80×1×16 bits, 81×1×16 bits, 1×256×8 bits, and/or other sizes). In this regard, VLBs 1244 may be used primarily to store data for individual lines (e.g., individual rows or columns) for line based processing of thermal image frames.

In one embodiment, data that is greater than approximately 8 kbits and less than approximately 256 kbits may be stored by MSSs 1242. Such data may be referred to as full frame buffers, double full frame buffers, histograms, and/or other terms. Such data may be of various sizes as set forth in FIGS. 16A-E or other sizes (e.g., 80×60×8 bits, 80×60×16 bits, 80×60×32 bits, 1×2048×8 bits, and/or other sizes). In this regard, MSSs 1244 may be used primarily to store data for one or more thermal image frames (e.g., MMSs 1244 may be used as full frame buffers in some embodiments).

Figure 16A:
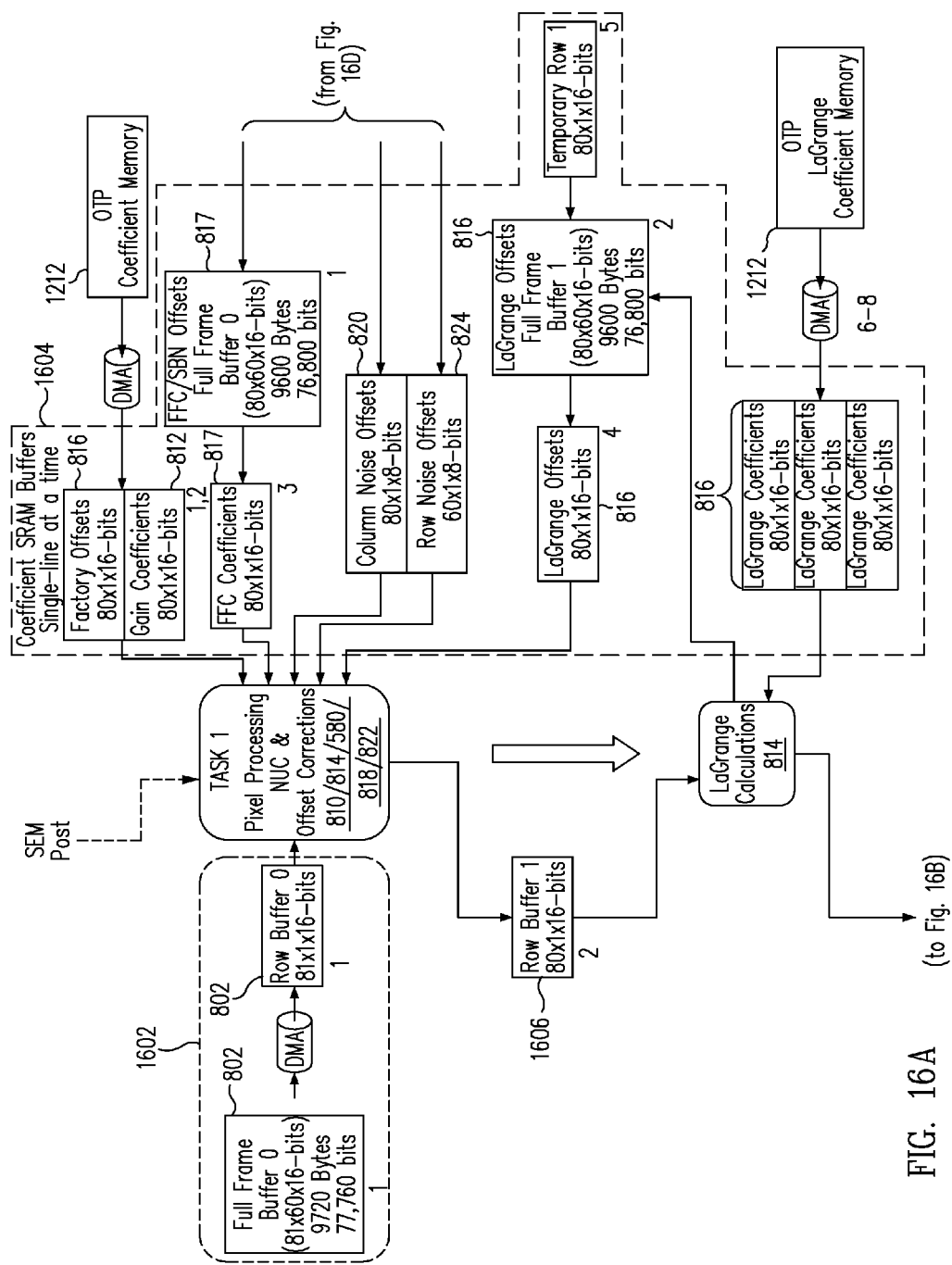
FIGS. 16A-E illustrate various operations performed by a memory system and a processing device in accordance with embodiments of the disclosure.

Referring now to FIG. 16A, data 1602 includes an image frame 802 (e.g., a thermal image frame) received from infrared sensor assembly 128 for processing in one or more pipeline stages corresponding to blocks 810, 814, 580, 818, and 822 of FIG. 8. As shown, data 1602 may be received as a full image frame 802 and provided on a line by line basis through a VLB 1244 for processing. In some embodiments, image frame 802 may be approximately 80 by 60 pixels, and individual lines may be approximately 80 pixels or fewer, or approximately 60 pixels or fewer.

Data 1604 includes factory gain terms 812, factory offset terms 816 (e.g., including pixel offsets/coefficients and LaGrange offsets/coefficients in one embodiment), NUC terms 817, column FPN terms 820, and row FPN terms 824 received from various memories and/or provided in accordance with various processing as shown.

In some embodiments, a plurality of NUC terms 817 may be determined for an unblurred thermal image frame from an intentionally blurred thermal image frame. NUC terms 817 associated with a single one of the individual lines may be stored in a VLB 1244 and applied to the individual lines.

In some embodiments, a plurality of factory calibration terms 812/816 may be read from OTP memory block 1212. Factory calibration terms 812/816 associated with a single one of the individual lines may be stored in a VLB 1244 and applied to the individual lines.

An individually processed line is provided as data 1606 stored in a VLB 1244 operating as a pipeline register to be used for LaGrange calculations in one or more pipeline stages corresponding to block 814. Following block 814, processed line data (e.g., adjusted by offsets and coefficients) is passed to FIG. 16B.

Figure 16B:
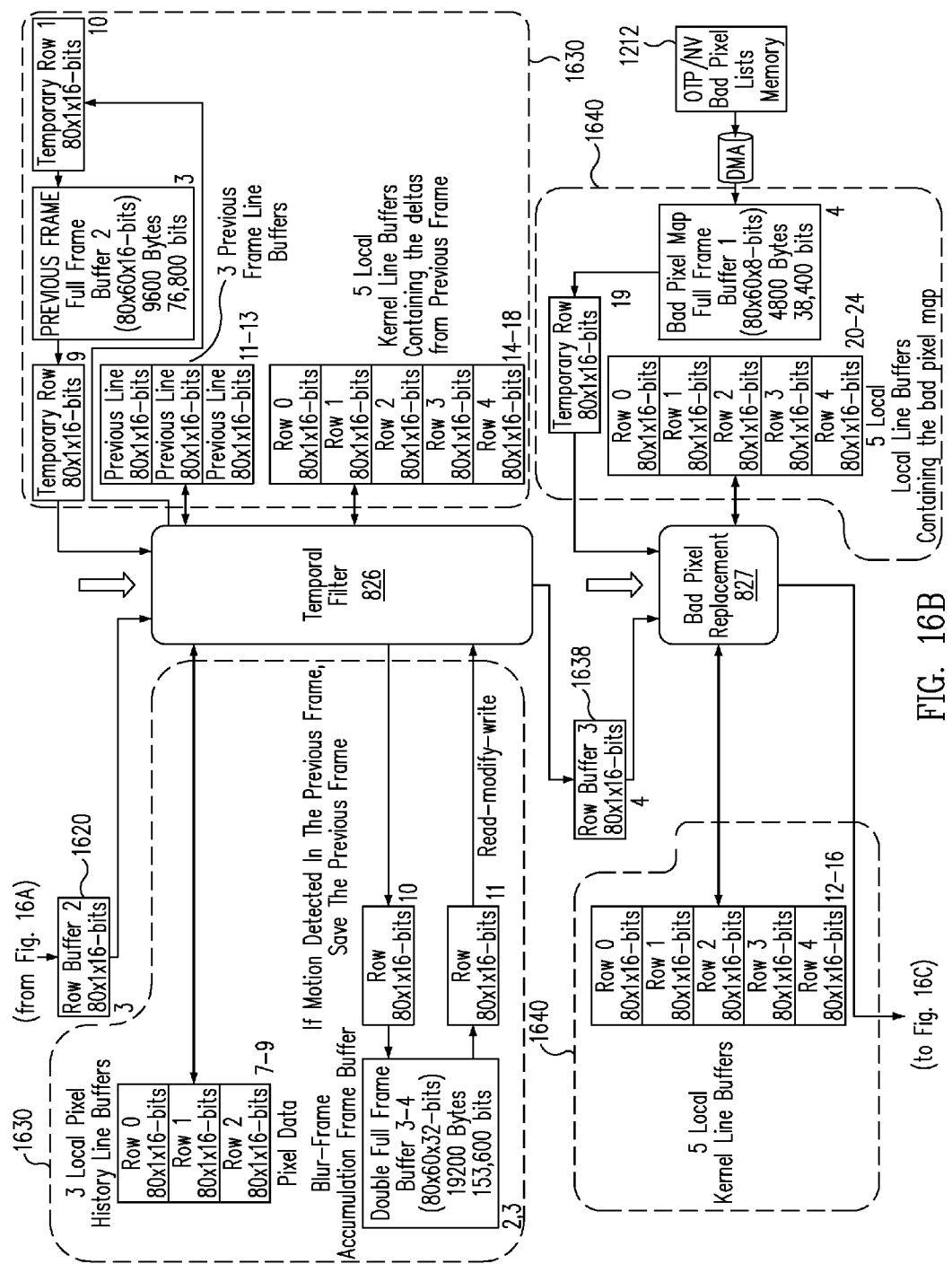

Referring now to FIG. 16B, processed line data 1620 received from FIG. 16A is stored in a VLB 1244 operating as a pipeline register and is provided for temporal filtering operations in one or more pipeline stages corresponding to block 826. Block 826 uses data 1630 which includes various lines and image frames that have been buffered, accumulated, and/or otherwise stored as shown. In particular, data 1630 may include multiple image frames that are accumulated to provide a blurred image frame in an accumulation frame buffer, individual lines of the current and accumulated image frames, local (e.g., adjacent) lines, a previous image frame, temporary lines, lines from multiple previous frames, and local line changes from previous image frames. Accordingly, in some embodiments, at least some of data 1630 corresponds to various data referenced in FIGS. 8-10.

In some embodiments, a current thermal image frame may be compared with a previous thermal image frame to determine whether a scene has changed in block 826. For example, a first set of individual lines may be buffered in a first set of corresponding memory buffers (e.g., local pixel history fine buffers in one embodiment) that correspond to a subset of the current thermal image frame. A second set of individual lines may be buffered in a second set of corresponding memory buffers (e.g., previous frame line buffers in one embodiment) that correspond to a subset of a previous thermal image frame. The first and second sets of buffered individual lines may be compared to determine if a scene has changed (e.g., changes between the buffered lines of the thermal image frames may be buffered using one or more local kernel line buffers in one embodiment). If the scene has changed, then the current and/or previous thermal image frames may be accumulated (e.g., in a blur-frame accumulation frame buffer in one embodiment).

Following block 826, processed line data 1638 (e.g., temporally filtered line data) is stored in a VLB 1244 operating as a pipeline register and is provided for bad pixel replacement operations in one or more pipeline stages corresponding to block 827. Data 1640 includes bad pixels maps/lists provided by OTP memory 1212 as well as various lines that have been buffered, accumulated, and/or otherwise stored for processing in block 827 as shown. In particular, data 1640 may include local lines, a bad pixel map provided as a full frame and temporary lines, and local lines containing the bad pixel map.

In some embodiments, one or more pixels of a thermal image frame may be replaced in block 827. For example, a first set of individual lines may be buffered in a first set of corresponding memory buffers (e.g., local kernel line buffers) that correspond to a subset of the thermal image frame. A second set of individual lines may be buffered in a second set of corresponding memory buffers (e.g., local line buffers) that correspond to a subset of a pixel map. One or more pixels of the first set of individual lines may be replaced based on the second set of individual lines. Following block 827, processed line data (e.g., with bad pixels replaced) is passed to FIG. 16C.

Figure 16C:
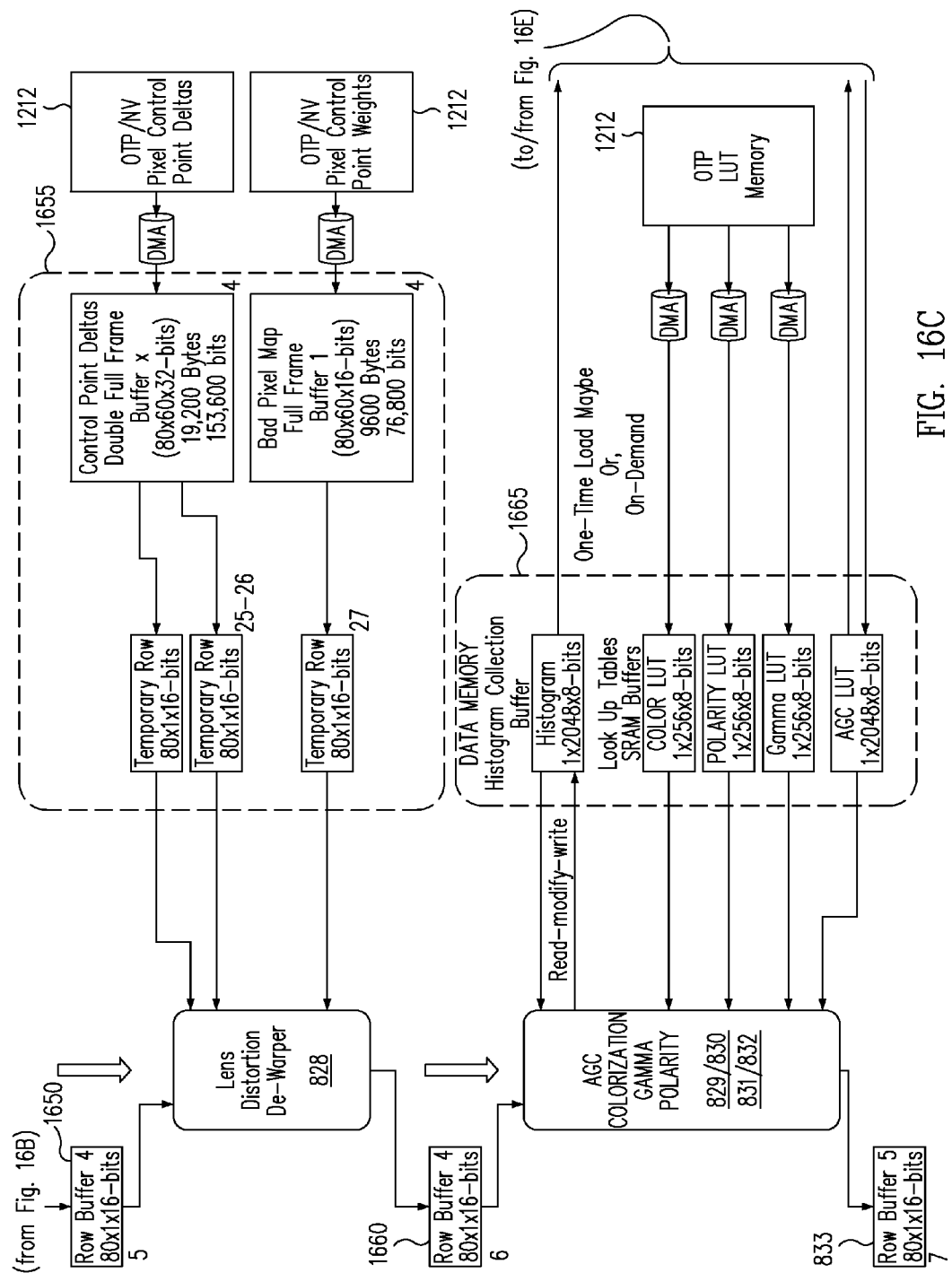

Referring now to FIG. 16C, processed line data 1650 received from FIG. 16B is stored in a VLB 1244 operating as a pipeline register and is provided for distortion processing operations (e.g., to compensate for warping or distortion effects caused by one or more optical elements and/or other sources) in one or more pipeline stages corresponding to block 828. Data 1655 includes various pixel deltas and weights, and bad pixel maps provided by OTP memory 1212 (e.g., collectively and separately referred to as distortion correction terms). In particular, data 1655 may include pixel deltas, pixel weights, and bad pixel maps buffered in full frames and in individual lines.

In some embodiments, individual lines of a thermal image frame may be corrected to compensate for distortion. For example, a plurality of distortion correction terms may be read from OTP memory block 1212. Distortion correction terms associated with a single one of the individual lines may be stored in a VLB 1244 and applied to the individual lines.

Following block 828, processed line data 1660 (e.g., de-warped line data) is stored in a VLB 1244 operating as a pipeline register and is provided for video polarity processing, gamma correction processing, automatic gain compensation processing, and pseudo-color processing in one or more pipeline stages corresponding to blocks 829, 830, 831, and 832. Data 1665 includes various LUT information provided by OTP memory 1212, histograms, and calculated values as shown.

In some embodiments, LUT data may be used in the processing performed in blocks 829, 830, 831, and 832. For example, LUT data may be read from OTP memory block 1212. LUT data associated with a single one of the individual lines may be stored in a VLB 1244 and applied to the individual lines. Following blocks 829, 830, 831, and 832, processed line data (e.g., processed by blocks 829, 830, 831, and 832) for a result image frame 833 (e.g., a result thermal image frame) is provided and stored in a VLB 1244 operating as a pipeline register.

Figure 16D:
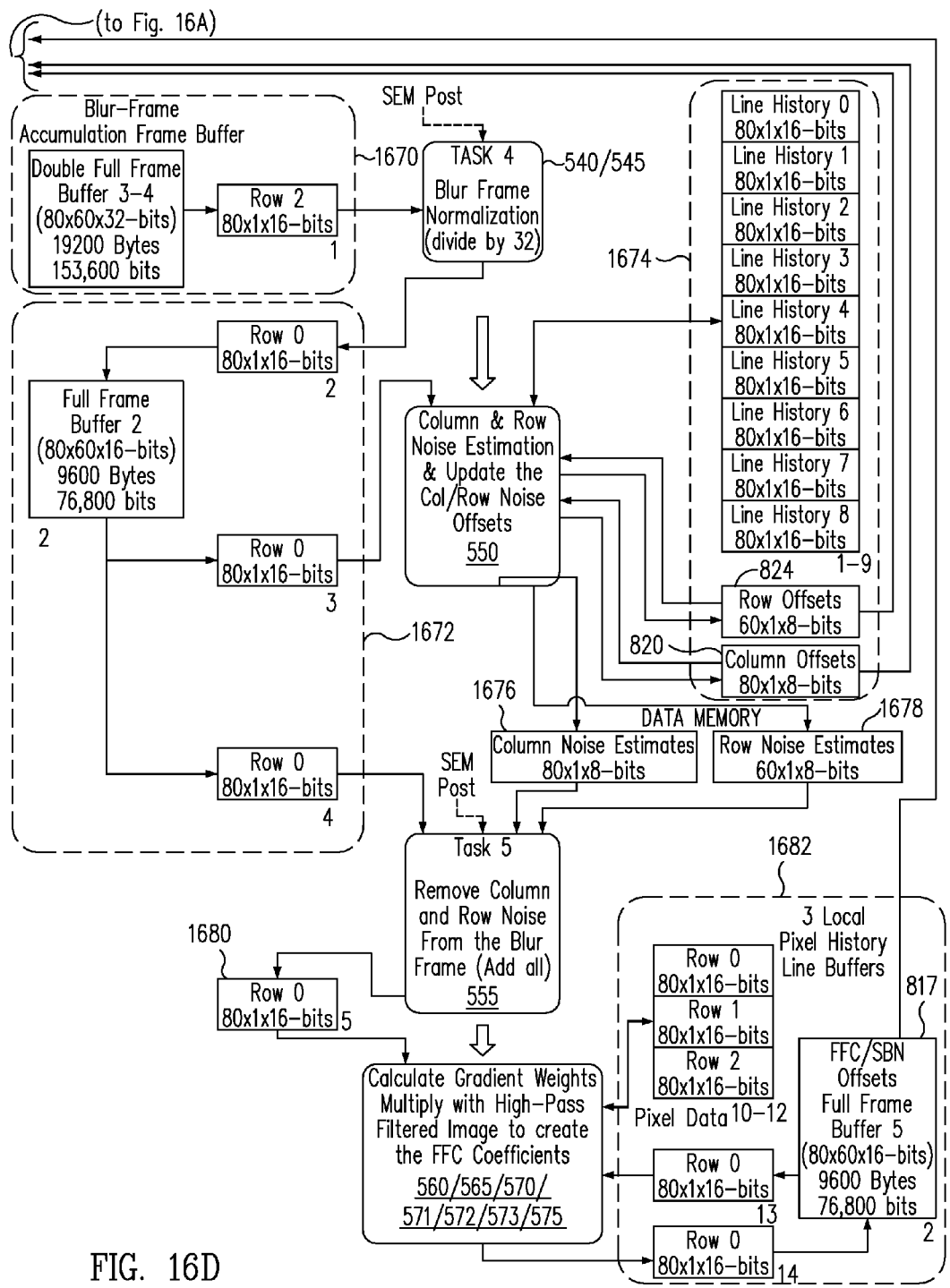

Referring now to FIG. 16D, data 1670 includes accumulated thermal image frames (e.g., provided in accordance with block 535) received as full thermal image frames and provided as individual lines for processing in one or more pipeline stages corresponding to blocks 540 and 545. In particular, data 1670 may include multiple image frames that are accumulated to provide a blurred image frame in an accumulation frame buffer and individual lines of the accumulated image frames.

Following blocks 540/545, processed line data 1672 (e.g., blurred averaged accumulated lines) is stored in various VLBs 1244 operating as pipeline registers and multiple lines are buffered as a full image frame in an MMS 1242. Data 1672 is provided for processing in one or more pipeline stages corresponding to blocks 550 and 555.

Block 550 also uses data 1674 which includes previous line data. Block 550 also provides column FPN terms 820 and row FPN terms 824 as part of data 1674 which is provided to FIG. 16A as shown. Block 550 also provides column noise estimates 1676 and row noise estimates 1678 to block 555 which are stored in VLBs 1244 operating as pipeline registers.

In some embodiments, a previous thermal image frame may be used to determine column FPN terms 820 and row FPN terms 824. For example, a set of individual lines may be buffered in a set of corresponding memory buffers that correspond to a subset of the previous thermal image frame. The lines of the previous thermal image frame may be processed to determine row and column noise terms for the current thermal image frame.

Block 555 uses data 1672, 1676, and 1678 to provide processed line data 1680 (e.g., with column and row noise removed) which is stored in a VLB 1244 operating as a pipeline register. Blocks 560, 565, 570, 571, 572, 573, and 575 use data 1680 and 1682 (e.g., including buffered line data and NUC terms 817) and operate as one or more pipeline stages to provide NUC terms 817 to FIG. 16A as shown. In particular, data 1682 may include individual lines of NUC terms 817.

Figure 16E:
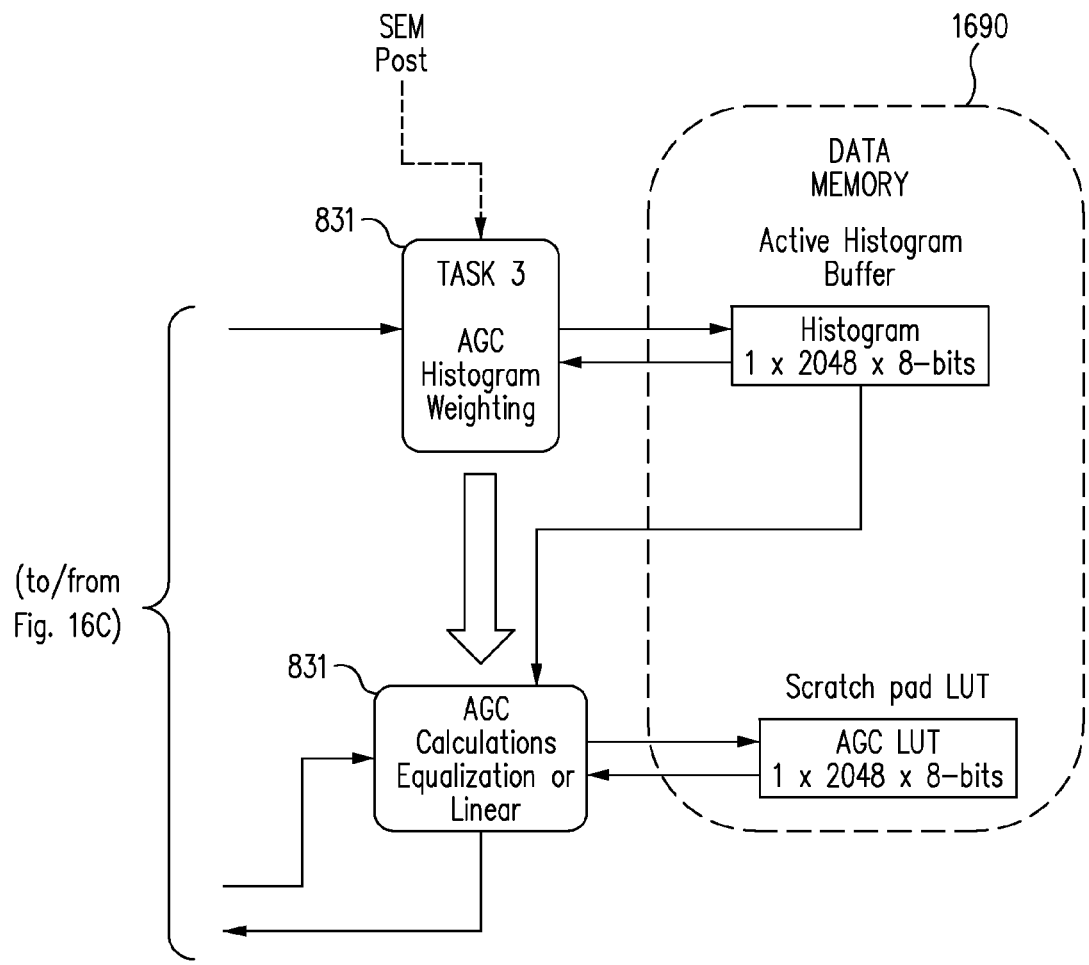

Referring now to FIG. 16E, further operations of block 831 are identified. In this regard, block 831 uses data 1690 that includes histogram and LUT information as shown for processing in one or more pipeline stages and to communicate such data with FIG. 16C as shown.

In view of the present disclosure, it will be appreciated that line based processing of thermal image frames may be performed in an efficient pipelined manner, thus distributing processing tasks into smaller tasks than conventional frame based processing. Such line based processing may be efficiently used with hardware and software optimized for fast and efficient processing, such as relatively small memory buffers with single interface memory blocks may be used with associated switch fabric circuitry to support efficient line based processing.

In this regard, memory system 1250 may be efficiently and flexibly utilized by processing module 160 to provide individual components with memory access through associated buses 1260, rather than a conventional main memory system shared system bus. In addition, by passing clock signals from individual components over buses 1260, individual memory blocks of memory system 1260 may be separately synchronized with their associated components (e.g., owners).

In addition, as discussed, memory system 1250 may be used to transfer (e.g., move, copy, and/or otherwise pass) and share data between individual components without requiring a centralized memory system to perform such transfers through conventional read and write commands and/or direct memory access (DMA) engines. For example, control signals 1408 may be used to change the particular port 1420 of a VLB 1244, thus effectively transferring the data of its associated memory block 1402 to be used by a different component associated with a different port 1420 of the same VLB 1244. As discussed, data may also be transferred to different memory blocks 1402 my individual components as desired.

Other embodiments are also contemplated. In some embodiments, various system implementations described herein may be scaled for increased capacity and/or performance as desired for various implementations. For example, it is contemplated that one or more additional components (e.g., local or remote to processing module 160) may be networked or otherwise interfaced with memory system 1260 and/or processing module 160 to use the various features thereof. It is also contemplated that the various components of memory system 1260 may be may be scaled to accommodate such additional components and/or to improve performance.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:
1. A method comprising:
receiving a thermal image frame comprising a plurality of individual lines, wherein each individual line comprises substantially an entire row or column of thermal image data captured by a plurality of infrared sensors;
providing each individual line of the thermal image frame to a line based image processing pipeline;
performing image processing operations on the individual lines in stages of the image processing pipeline; and
buffering the individual lines for the pipeline stages, wherein the buffering comprises, for each individual line:
passing the individual line from a first one of the pipeline stages to a memory system,
storing the individual line in one of a plurality of virtual line buffers of the memory system, and
passing the stored individual line from the one of the virtual line buffers to a second one of the pipeline stages.
2. The method of claim 1, wherein the image processing operations comprise:
storing a plurality of factory calibration terms associated with a single one of the individual lines in a memory buffer; and applying the stored factory calibration terms to the one of the individual lines.

3. The method of claim 1, wherein the thermal image frame is a current thermal image frame, wherein the image processing operations comprise:
buffering a first set of the individual lines comprising a subset of the current image frame in a first set of corresponding memory buffers of a memory system;
buffering a second set of individual lines comprising a subset of a previous thermal image frame in a second set of corresponding memory buffers of the memory system;
comparing the first and second sets of individual lines to determine if a scene has changed; and
if the scene has changed, accumulating at least one of the image frames in an accumulation buffer of the memory system to provide a temporally filtered image frame.

4. The method of claim 1, wherein the image processing operations comprise:
buffering a set of the individual lines comprising a subset of the image frame in a first set of corresponding memory buffers;
buffering a subset of a pixel map in a second set of corresponding memory buffers;
replacing one or more pixels of the individual lines based on the subset of the pixel map;
applying a plurality of distortion correction terms to one of the individual lines; and
applying look up table (LUT) data to the one of the individual lines.

5. The method of claim 1, wherein the thermal image frame is a current thermal image frame, wherein the image processing operations comprise:
buffering a set of individual lines comprising a subset of a previous image frame in a set of corresponding memory buffers; and
processing the individual lines of the previous thermal image frame to determine row and column noise terms for the current thermal image frame.

6. The method of claim 1, wherein the thermal image frame is an unblurred thermal image frame, wherein the image processing operations comprise:
determining a plurality of non-uniform correction (NUC) terms for a single one of the individual lines of the unblurred thermal image frame from an intentionally blurred thermal image frame;
storing the NUC terms associated with a single one of the individual lines in a memory buffer; and
applying the stored NUC terms to the one of the individual lines.

7. The method of claim 1, wherein each individual line comprises approximately 80 pixels or fewer.

8. The method of claim 1, further comprising:
operating a switch fabric to couple a first port of a memory buffer with a memory block of the memory buffer, wherein the memory block comprises a single interface adapted to support a single read or write operation at a time;
transferring a first one of the individual lines between a first component and the memory block over a first bus, through the first port, and through the single interface;
subsequently operating the switch fabric to couple a second port of the memory buffer with the memory block; and transferring a second one of the individual lines between a second component and the memory block over a second bus, through the second port, and through the single interface.

9. An infrared imaging module comprising:
a sensor input block adapted to receive a thermal image frame comprising a plurality of individual lines, wherein each individual line comprises substantially an entire row or column of thermal image data captured by a plurality of infrared sensors;
a processing device comprising a line based image processing pipeline adapted to perform image processing operations on the individual lines in stages of the image processing pipeline;
a memory system adapted to buffer the individual lines for the pipeline stages;
wherein the processing device is adapted to, for each individual line, pass the individual line from a first one of the pipeline stages to a memory system; and
wherein the memory system is adapted to store the individual line in one of a plurality of virtual line buffers of the memory system and pass the stored individual line from the one of the virtual line buffers to a second one of the pipeline stages.

10. The infrared imaging module of claim 9, wherein the processing device is adapted to:
store factory calibration terms associated with a single one of the individual lines in a memory buffer of the memory system; and
apply the stored factory calibration terms to the one of the individual lines.

11. The infrared imaging module of claim 9, wherein the thermal image frame is a current thermal image frame, wherein the memory system is adapted to:
buffer a first set of the individual lines comprising a subset of the current image frame in a first set of corresponding memory buffers of the memory system, and
buffer a second set of individual lines comprising a subset of a previous thermal image frame in a second set of corresponding memory buffers of the memory system; and
wherein the processing device is adapted to:
compare the first and second sets of individual lines to determine if a scene has changed, and
if the scene has changed, accumulate at least one of the image frames in an accumulation buffer of the memory system to provide a temporally filtered image frame.

12. The infrared imaging module of claim 9,
wherein the memory system is adapted to:
buffer a set of the individual lines comprising a subset of the image frame in a first set of corresponding memory buffers of the memory system, and
buffer a subset of a pixel map in a second set of memory buffers of the memory system; and
wherein the processing device is adapted to:
replace one or more pixels of the first set of individual lines based on the subset of a pixel map,
apply a plurality of distortion correction terms to one of the individual lines, and
apply look up table (LUT) data to the one of the individual lines.

13. The infrared imaging module of claim 9, wherein the thermal image frame is a current thermal image frame, wherein the memory system is adapted to buffer a set of individual lines comprising a subset of a previous image frame in a set of corresponding memory buffers of the memory system; and wherein the processing device is adapted to process the individual lines of the previous thermal image frame to determine row and column noise terms for the current thermal image frame.

14. The infrared imaging module of claim 9, wherein the thermal image frame is an unblurred thermal image frame, wherein the processing device is adapted to:

determine a plurality of non-uniform correction (NUC) terms for a single one of the individual lines of the unblurred thermal image frame from an intentionally blurred thermal image frame;

store the NUC terms in a memory buffer of the memory system; and apply the stored NUC terms to the one of the individual lines.

15. The infrared imaging module of claim 9, wherein each individual line comprises approximately 80 pixels or fewer.

16. The infrared imaging module of claim 9, wherein the memory system is adapted to:

operate a switch fabric to couple a first port of a memory buffer with a memory block of the memory buffer, wherein the memory block comprises a single interface adapted to support a single read or write operation at a time;

transfer a first one of the individual lines between a first component and the memory block over a first bus, through the first port, and through the single interface;

subsequently operate the switch fabric to couple a second port of the memory buffer with the memory block; and transfer a second one of the individual lines between a second component and the memory block over a second bus, through the second port, and through the single interface.

* * * * *